(12) United States Patent
Morinaka

(10) Patent No.: US 6,376,784 B1
(45) Date of Patent: Apr. 23, 2002

(54) VIBRATING TRANSPORT APPARATUS AND METHOD OF DETECTING VIBRATION CHARACTERISTIC

(75) Inventor: Hiroaki Morinaka, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/221,137

(22) Filed: Dec. 28, 1998

(30) Foreign Application Priority Data

Dec. 27, 1997 (JP) ............................................. 9-369319
Dec. 27, 1997 (JP) ............................................. 9-369320
Dec. 27, 1997 (JP) ............................................. 9-369321
Dec. 27, 1997 (JP) ............................................. 9-369322

(51) Int. Cl.⁷ ............................................. G01G 13/04
(52) U.S. Cl. ............................. 177/121; 177/DIG. 11; 73/580
(58) Field of Search ............................. 177/119, 120, 177/121, 122, 210 FP, 211, 229, DIG. 11; 73/580; 198/751; 222/55, 77

(56) References Cited

U.S. PATENT DOCUMENTS

| | | | | |
|---|---|---|---|---|
| 3,581,871 A | * | 6/1971 | Forman | 222/77 |
| 4,002,270 A | | 1/1977 | Reiner | 222/58 |
| 4,215,754 A | * | 8/1980 | Hagedorn et al. | 177/211 |
| 4,411,159 A | * | 10/1983 | Spear et al. | 177/211 |
| 4,921,090 A | | 5/1990 | Gregor | 198/769 |
| 5,054,606 A | * | 10/1991 | Musschoot | 198/751 |
| 5,074,403 A | * | 12/1991 | Myhre | 198/751 |
| 5,510,581 A | * | 4/1996 | Angel | 177/211 |
| 5,639,995 A | * | 6/1997 | Mosher | 177/122 |
| 5,714,695 A | * | 2/1998 | Burns | 177/211 |
| 5,773,765 A | * | 6/1998 | Sashiki et al. | 177/25.12 |
| 5,780,780 A | * | 7/1998 | Ahmed | 177/119 |
| 5,865,297 A | * | 2/1999 | Chiba et al. | 198/751 |
| 5,994,170 A | * | 8/1999 | La Veine et al. | 198/751 |
| 6,032,828 A | * | 3/2000 | Gicaza et al. | 222/55 |
| 6,079,549 A | * | 6/2000 | Meitinger | 198/751 |

FOREIGN PATENT DOCUMENTS

| | | |
|---|---|---|
| EP | 0281400 A2 | 9/1988 |
| EP | 0629568 A2 | 12/1994 |
| EP | 0781718 A2 | 7/1997 |
| GB | 1094464 | 12/1964 |
| WO | WO92/22861 | 12/1992 |

OTHER PUBLICATIONS

"McGraw–Hill Encyclopedia of Science and Technology, vol. 11" pp. 529–531, Copyright 1977.*

* cited by examiner

*Primary Examiner*—Randy W. Gibson
(74) *Attorney, Agent, or Firm*—Staas & Halsey LLP

(57) ABSTRACT

To provide a compact vibrating transport apparatus in which the amount of an article M to be transported can be controlled highly accurately, the vibrating transport apparatus is designed to transport the article M loaded on a trough 4 by vibrating the trough 4 in a predetermined vibrating direction. The apparatus includes strain gauges 14a to 14d mounted on a portion of the transport apparatus where elastic strains are developed upon placement of the article M on the trough 4, and a weight detecting circuit 15 for detecting the weight W of the article M placed on the trough 4 on the basis of the amount of the strains detected by the strain gauges 14a to 14d.

17 Claims, 16 Drawing Sheets

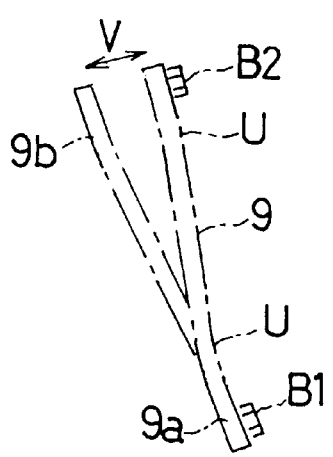
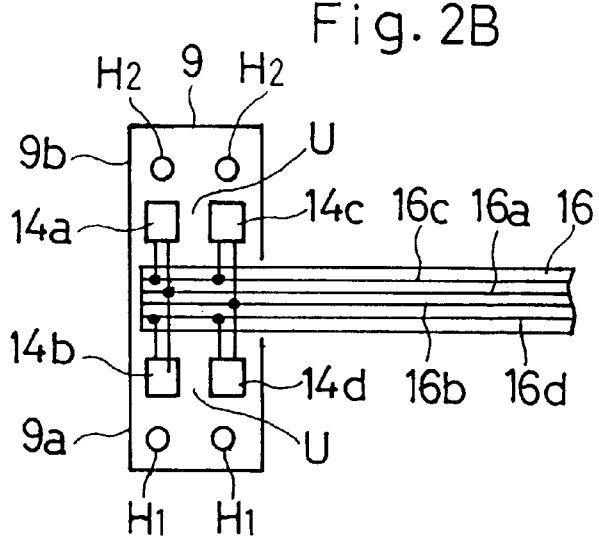
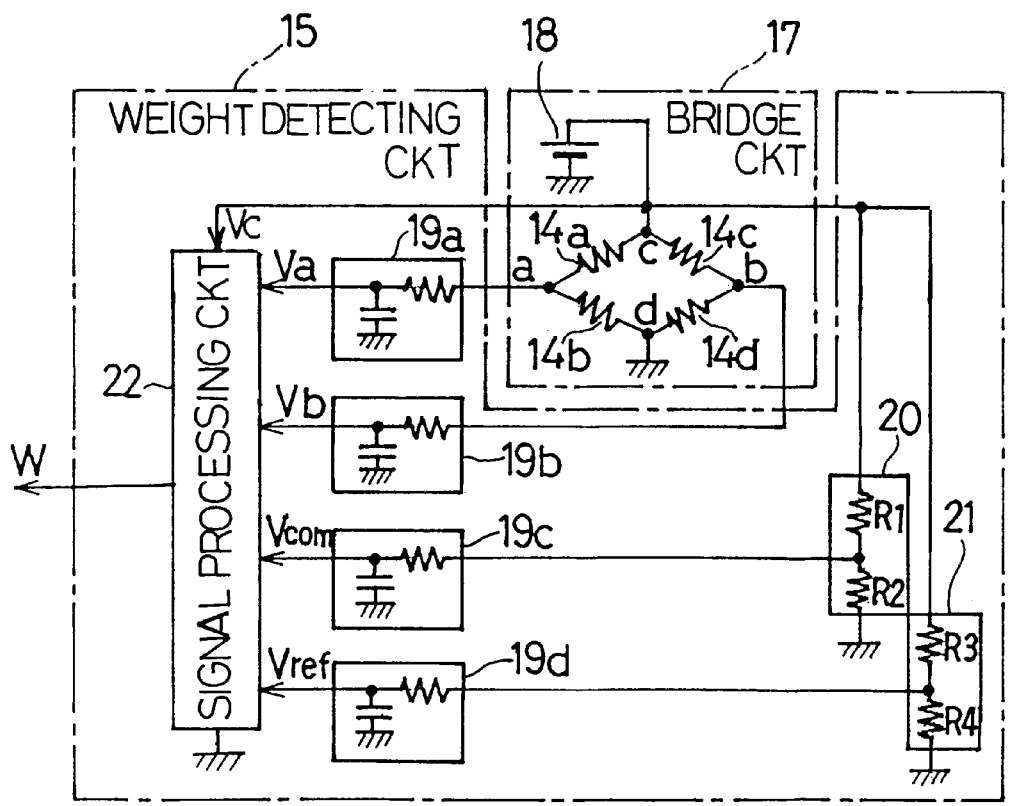

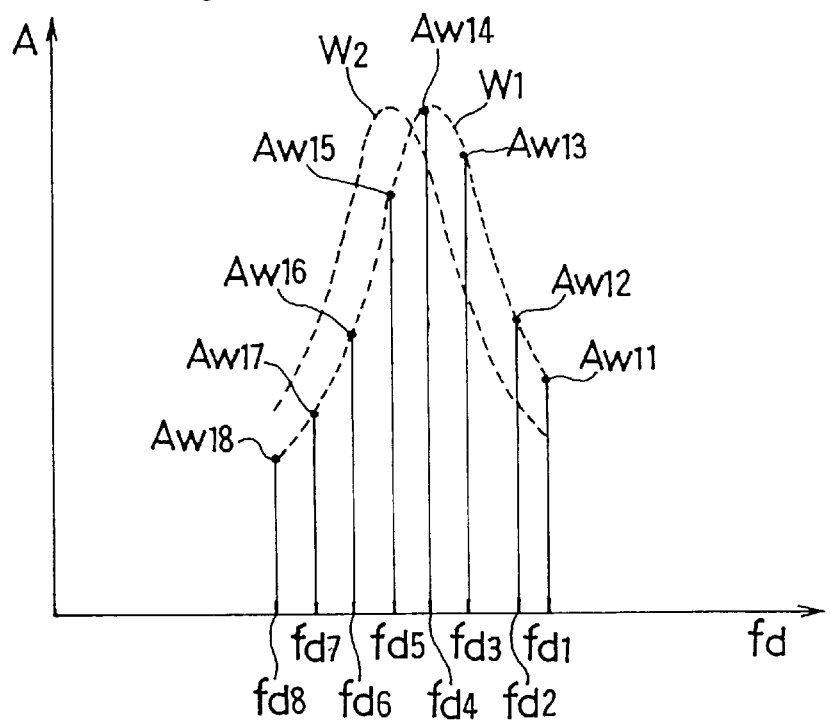

VIBRATING TRANSPORT APPARATUS AND METHOD OF DETECTING VIBRATION CHARACTERISTIC

BACKGROUND OF THE INVENTION

1. Field of the Invention

The present invention relates to a vibrating transport apparatus capable of transporting a predetermined weight of articles placed on a trough for a given length of time by vibrating the trough.

2. Description of the Prior Art

It has been often experienced that when a food material such as, for example, snacks and/or candies is produced, articles in the form of granulates or the like of a raw material or a semi-processed products is transported by the use of a vibrating transport apparatus (hereinafter referred to as a vibrating feeder) from one production step to another at a predetermined supply rate, that is, in a predetermined weight for a given unitary time. The vibrating feeder of the type used in this application makes use of a weighing device utilizing a load cell for measuring the entire vibrating feeder, while the articles supplied from a supply conveyor onto the trough are transported, at intervals of a short unitary time, so that the weight of the articles on the trough of the vibrating feeder can be measured by subtracting the known weight of the vibrating feeder from the measured total weight. Based on the weight of the articles so measured, a transport amount control device of the vibrating feeder controls the transport speed of the supply conveyor on a PID (Proportional Integral Differential) control scheme so that the weight of the articles supplied from the supply conveyor onto the trough can attain a predetermined value for the given unitary time. At this time, in order to compensate for an error based on a delay in the PID control, a correction control to finely adjust the transport speed of the vibrating feeder is carried out to render the amount of the articles being transported (weight/time) towards the subsequent production step to attain a value equal to the target transport amount.

Where the articles such as snacks and/or candies are to be bagged, the articles are fragmented in a predetermined quantity by a combinational weighing apparatus utilizing the load cell referred to above.

A mechanism of the combinational weighing apparatus is schematically shown in a side view in FIG. 18. The articles M are supplied through a supply chute 60 onto a center portion of a conical dispensing feeder 61 having a small height. When the dispensing feeder 61 is vibrated, the articles M are dispensed into a plurality of vibrating feeders 1 arranged around and adjacent the periphery of the dispensing feeder 61 and spaced an equal distance from each other in a direction circumferentially of the dispensing feeder 61. The articles M on the vibrating feeders 1 are subsequently transported towards a corresponding number of pool hoppers 62 disposed immediately below the associated vibrating feeders 1. After the articles M are temporarily pooled in the respective pool hoppers 62 in synchronism with a weighing operation, discharge gates of the pool hoppers 62 are opened to allow the articles M to be discharged onto associated weighing hoppers 64. A weighing means 65 such as a load cell for each weighing hopper 64 measures the weight W of the articles M within the respective weighing hopper 64 to provide a weight signal. The articles M of which the weight W has been measured are, when discharge gates 66 of the weighing hoppers 64 are opened, collected in corresponding collecting chutes 67 and then onto a discharge chute 68. The articles M so discharged are bagged by a bagging machine (not shown) to provide bagged products each having a predetermined target weight. Each of the weighing hoppers 64 has preset therein a target weight to which the articles M are supplied and, therefore, depending on the extent of the weighed value relative to the target value, the respective amplitudes or the respective vibrating time lengths of the vibrating feeders 1 are adjusted so that the weighed value can become equal to the target value.

With the conventional combinational weighing apparatus, the weight detection or the control of the amount of transport of the articles on each of the vibrating feeders 1 is carried out by reading the weight measured by the associated weighing hopper 64, that is, the weight measured at a location downstream of the respective vibrating feeder 1 and not by reading accurately on a real-time basis the weight or the amount of transport of the articles on the respective vibrating feeder 1. Therefore, a considerable time lag tends to be involved along with an insufficient response. For this reason, it has been found difficult to accomplish an accurate control of the amount of the articles to be supplied (that is, the transport amount).

Also, in the prior art vibrating feeder 1 of the type discussed above, since a load cell is used to measure the total weight of the vibrating feeder 1 having a relatively great weight, the apparatus as a whole tends to become bulky and expensive.

In addition, in the prior art vibrating feeder 1, the control of the transport amount, that is, the amount of the articles to be transported by the vibrating feeder 1 is carried out by changing driving energies (electric driving power) to change the amplitude of vibration of the vibrating feeder 1. Accordingly, if the transport amount is increased by increasing the amplitude of vibration of the vibrating feeder 1, the amount of heat evolved by an electromagnetic coil tends to increase, accompanied by increase of energies consumed.

Yet, when the vibrating feeder is to be halted, the articles tends to be transported under the influence of an inertia even though the driving energies are interrupted, and therefore, an error in transport amount tends to become considerable.

SUMMARY OF THE INVENTION

Accordingly, the present invention has been devised with a view to substantially eliminating the above discussed problems inherent in the prior art and is intended to provide an improved vibrating transport apparatus capable of accomplishing the detection of the weight of the articles or the transport amount control accurately on a real-time basis with minimized energy consumption and also having a high response exhibited when the apparatus is brought to a halt.

Another important object of the present invention is to provide an improved vibrating transport apparatus of the type referred to above, which has a simplified structure enough to allow the vibrating transport apparatus to be assembled compact in size, and which is capable of accomplishing a highly accurate measurement of the weight of the articles on the trough and also capable of highly accurately controlling the rate of supply of the articles towards the subsequent production step with a simplified control system.

A further important object of the present invention is to provide a method of detecting a vibrating characteristic exhibited in the vibrating transport apparatus of the type referred to above.

In order to accomplish these objects, the present invention according to a first aspect thereof provides a vibrating transport apparatus for transporting an article loaded on a trough by vibrating the trough in a predetermined vibrating direction, which apparatus comprises a weight detector including at least one strain gauge mounted on a portion of the transport apparatus where elastic strains are developed upon placement of the article on the trough and operable to detect an amount of the strains, and a weight detecting circuit for detecting a weight of the article placed on the trough on the basis of the amount of the strains detected by the strain gauge.

According to the present invention, since the amount of the strains detected by the strain gauge changes with change in weight of the article on the trough, the weight of the article on the trough can advantageously be detected on a real-time basis. Also, no extra weight detector is needed in the vibrating transport apparatus.

In one preferred embodiment of the present invention, the vibrating transport apparatus may further comprise an amplitude detector including an additional strain gauge mounted on a portion where elastic strains are developed as a result of vibration of the trough and operable to detect an amount of the strains, and an amplitude detecting circuit for detecting an amplitude of vibration of the trough on the basis of the amount of the strains detected by the additional strain gauge. This additional strain gauge may be employed in common with the strain gauge of the weight detector.

According to this feature, since the amplitude of vibration of the trough can be detected from the amount of strains detected by the additional strain gauge, no extra amplitude detector is needed in the vibrating transport apparatus.

In another preferred embodiment of the present invention, the strain gauge of the weight detector or the amplitude detector may be mounted on a portion of a spring member for elastically supporting the trough therethrough on a base.

In a further preferred embodiment of the present invention, the strain gauge of the weight detector is mounted on a portion of an elastic member for elastically supporting the base therethrough on a machine framework. The elastic member may be in the form of a rubber block, a coil spring or a vibration damper.

According to this structure, in addition to the capability of detecting the weight of the article on the trough, a bias of the article on the trough can also be detected.

The present invention according to a second aspect thereof provides a vibrating transport apparatus which comprises a weight detector for detecting a weight of the article placed on the trough; a storage means for storing an amplitude versus weight characteristic of a vibrating system of the trough; and a transport control means for determining an amplitude corresponding to the weight of the article, which has been detected by the weight detector, from the storage means, calculating a transport amount for a given unitary time from the determined amplitude and the weight of the article, and controlling the transport apparatus on the basis of the transport amount which has been calculated.

According to this feature, the weight of the article is detected by the weight detector as placed on the trough, not at a location downstream of the transport apparatus with respect to the direction of transport of the article, and the transport amount of the article can be calculated on a real-time basis from the detected weight and the amplitude of vibration of the trough obtained from the storage means in correspondence with the detected weight. By controlling the vibrating frequency, the amplitude of vibration and the operating time of the transport apparatus on the basis of the calculated transport amount, the transport apparatus can be accurately controlled.

In a further preferred embodiment of the present invention, the weight detector may include at least one strain gauge mounted on a portion of the transport apparatus where elastic strains are developed upon placement of the article on the trough. This feature makes it possible to assembly the weight detector in a simplified structure and compact in size.

The present invention according to a third aspect thereof provides a vibrating transport apparatus which comprises a weight detector for detecting a weight of the articles placed on the trough; an amplitude detector for detecting an amplitude of vibration of the trough; and a transport control means for calculating a transport amount for a given unitary time from the weight of the article, which has been detected by the weight detector, and the amplitude which has been detected by the amplitude detector and controlling the transport apparatus on the basis of the calculated transport amount.

According to this feature, the transport amount of the article can be calculated on a real-time basis with the use of the weight of the article on the trough detected by the weight detector and the amplitude of vibration of the trough detected by the amplitude detector. By controlling the vibrating frequency, the amplitude of vibration and the operating time of the transport apparatus on the basis of the calculated transport amount, the transport apparatus can be controlled accurately.

The present invention according to a fourth aspect thereof provides a vibrating transport apparatus which comprises at least one strain gauge mounted on a spring member used to connect the trough and a base together; a weight detecting circuit for detecting a weight of the article placed on the trough on the basis of an electric output from the strain gauge; an amplitude detecting circuit for detecting an amplitude of vibration of the trough on the basis of the electric output from the strain gauge; and a transport control means for calculating a transport amount for a given unitary time on the basis of the detected weight and the detected amplitude and controlling the transport apparatus on the basis of the calculated transport amount.

According to this feature, the transport amount of the article can be calculated on a real-time basis with the use of the weight of the article on the trough and the amplitude of vibration of the trough, both detected from the amount of strains detected by the strain gauge mounted on the spring member. By controlling the vibrating frequency, the amplitude of vibration and the operating time of the transport apparatus, the transport apparatus can be controlled accurately.

The present invention according to a fifth aspect thereof provides a vibrating transport apparatus which comprises an amplitude detector for detecting an amplitude of vibration of the trough; a storage means for storing an amplitude versus weight characteristic of a vibrating system of the trough; and a transport control means for determining a weight of the article placed on the trough on the basis of the amplitude, which has been detected by the amplitude detector, and the amplitude versus weight characteristic stored in the storage means, calculating a transport amount for a given unitary time on the basis of the determined weight of the article and the detected amplitude and controlling the transport apparatus on the basis of the calculated transport amount.

According to this feature, the transport amount of the article can be calculated on a real-time basis with the use of the amplitude of vibration of the trough detected by the amplitude detector and the weight of the article obtained from the storage means. By controlling the vibrating frequency, the amplitude of vibration and the operating time of the transport apparatus, the transport apparatus can be controlled accurately.

The present invention according to a sixth aspect thereof provides a vibrating transport apparatus which comprises an amplitude detector for detecting an amplitude of vibration of the trough; a storage means for storing a resonance frequency characteristic of a vibrating system of the trough which corresponds to a weight of the article placed on the trough; and a transport control means for determining a weight of the article placed on the trough on the basis of the amplitude, which has been detected by the amplitude detector, and the resonance frequency characteristic stored in the storage means, calculating a transport amount for a given unitary time on the basis of the determined weight of the article and the detected amplitude and controlling the transport apparatus on the basis of the calculated transport amount.

According to this feature, the transport amount of the article can be calculated on a real-time basis with the use of the amplitude of vibration of the trough detected by the amplitude detector and the weight of the article obtained from the storage means. Moreover, since the weight of the article is determined by the utilization of the resonance frequency characteristic stored in the storage means in correspondence with the weight of the article, the accurate weight can be obtained and, hence, the calculated transport amount becomes accurate. Accordingly, by controlling the vibrating frequency, the amplitude of vibration and the operating time of the transport apparatus, the transport apparatus can be controlled more accurately.

The present invention according to a seventh aspect thereof provides a vibrating transport apparatus of a type designed to transport an article loaded on a trough by vibrating the trough in a predetermined vibrating direction with a vibrator. This transport apparatus comprises a frequency adjuster for adjusting a driving frequency of the vibrator; and a frequency control means for controlling an amplitude of vibration of the trough by controlling the frequency adjuster to change the driving frequency of the vibrator.

According to this feature, since the amplitude of vibration is changed with change of the driving frequency, the driving energies can be effectively utilized by using the driving frequency to approach a resonance point at all times.

The present invention according to an eighth aspect thereof provides a vibrating transport apparatus which comprises a frequency adjuster for adjusting a driving frequency of the vibrator; and a frequency control means for braking a transport of the article by controlling the frequency adjuster to change the driving frequency of the vibrator in a direction required to attenuate an amplitude of vibration of the trough.

According to this feature, by interrupting the supply of the driving energies after the amplitude of vibration of the trough has been abruptly attenuated by changing the driving frequency, a braking can be applied in a high response.

The present invention according to a ninth aspect thereof provides a vibrating transport apparatus which comprises a frequency adjuster for adjusting a driving frequency of the vibrator; a storage means for storing a resonance frequency characteristic of a vibrating system of the trough; and a frequency control means for controlling an amplitude of vibration of the trough by controlling the frequency adjuster on the basis of the resonance frequency characteristic, stored in the storage means, to change the driving frequency of the vibrator.

According to this feature, not only can the driving energies of the vibrator be utilized effectively, the amplitude of vibration can be shifted accurately to that effective to change the amplitude of vibration of the trough by changing to the driving frequency corresponding to the amplitude of vibration desired to be adjusted on the basis of the resonance frequency characteristic stored in the data storage means.

The present invention according to a tenth aspect thereof provides a vibrating transport apparatus which comprises a frequency adjuster for adjusting a driving frequency of the vibrator; a weight detecting means for detecting a weight of the article placed on the trough; a storage means for storing a plurality of amplitude versus driving frequency characteristics of a vibrating system of the trough which correspond to the weight of the article on the trough; and a frequency control means for controlling an amplitude of vibration of the trough by controlling the frequency adjuster on the basis of the amplitude versus driving frequency characteristic, corresponding to the weight of the article detected by the weight detecting means, to change the driving frequency of the vibrator.

According to this feature, the weight of the article is detected by the weight detector as placed on the trough, not at a location downstream of the transport apparatus with respect to the direction of transport of the article, and the driving frequency is changed to correspond to the amplitude of vibration desired to be adjusted on the basis of the amplitude versus driving frequency characteristic stored in the storage means in correspondence with the detected weight. Accordingly, the amplitude of vibration of the trough can quickly be changed to the amplitude desired to be changed, accompanied by increase in response. Also, since the driving frequency of the vibrator is changed, the driving energies can be utilized effectively.

The present invention according to an eleventh aspect thereof provides a vibrating transport apparatus which comprises a frequency adjuster for adjusting a driving frequency of the vibrator; and an amplitude detector for detecting an amplitude of vibration of the trough; a storage means for storing a relation between the amplitude, detected by the amplitude detector when the driving frequency of the vibrator is changed, and the driving frequency; and a frequency control means for controlling the amplitude of vibration of the trough by controlling the frequency adjuster on the basis of the amplitude versus driving frequency characteristic, stored in the storage means, to change the driving frequency of the vibrator.

According to this feature, by changing the driving frequency to a value corresponding to the amplitude of vibration desired to be adjusted on the basis of the amplitude versus driving frequency characteristic stored in the storage means, the amplitude of vibration of the trough can quickly be changed to a desired value accurately. Also, since the driving frequency of the vibrator is changed, the driving energies can be utilized effectively. In addition, since it is possible to store the amplitude versus driving frequency characteristic, which is determined during operation of the transport apparatus by the use of the amplitude detector, in the storage means, it is possible to pursue for change in characteristic of the apparatus with high sensitivity.

The present invention according to a twelfth aspect thereof provides a vibrating transport apparatus which comprises a frequency adjuster for adjusting a driving frequency of the vibrator; an amplitude detector for detecting an amplitude of vibration of the trough; a weight detector for detecting a weight of the article placed on the trough; a storage means for storing a relation between the amplitude, detected by the amplitude detector when the driving frequency of the vibrator is changed under the detected weight of the article, and the driving frequency in correspondence with the weight of the article; and a frequency control means for controlling the amplitude of vibration of the trough by controlling the frequency adjuster on the basis of the amplitude versus driving frequency characteristic, stored in the storage means in correspondence with the detected weight of the article, to change the driving frequency of the vibrator.

While the amplitude versus driving frequency characteristic changes with change of the weight of the article, the foregoing feature makes it possible to store in the storage means the amplitude versus driving frequency characteristic corresponding to the detected weight of the article and also to change the driving frequency to a value corresponding to the amplitude of vibration desired to be adjusted on the basis of contents stores in the storage means. Therefore, the amplitude of vibration of the trough can be more accurately shifted to the amplitude desired to be changed. Also, since the driving frequency of the vibrator is changed, the driving energies can be utilized effectively. Furthermore, since it is possible to store in the storage means the amplitude versus driving frequency characteristic of the transport apparatus that is determined by the amplitude detector during operation of the transport apparatus, it is possible to pursue for change in characteristic of the apparatus with high sensitivity.

The present invention according to a thirteenth aspect thereof provides a vibrating transport apparatus which comprises a trough for receiving an article thereon; a base; at least one leaf spring for supporting the trough therethrough on the base; a vibrator for vibrating the leaf spring; a weight detector for detecting a weight of the article placed on the trough; an amplitude detector for detecting an amplitude of vibration of the leaf spring; a data generating means for generating a data representative of a relation between a driving frequency of the vibrator and the amplitude detected by the amplitude detector by utilization of the weight of the article, detected by the weight detector during transport of the article by means of the trough, as a parameter; and a storage means for storing the data generated by the data generating means.

According to this feature, the data generating means automatically generates a data representative of the relation between the driving frequency of the vibrator and the amplitude detected by the amplitude detector by utilization of the weight of the article, detected by the weight detector during transport of the article by means of the trough, as a parameter, which data are stores successively in the storage means. Thereafter, when the transport amount is to be calculated, the weight of the article is obtained from the weight detector and the amplitude data of the trough corresponding to the driving frequency of the vibrator are read out from the storage means to cause the calculating means to precisely calculate the transport amount of the article on a real-time basis.

In one preferred embodiment, the weight detector may comprise at least one strain gauge mounted on the leaf spring for detecting an amount of strains developed in the leaf spring, and a weight detecting circuit for detecting the weight of the article on the basis of the amount of strains detected by the strain gauge. With this structure, since the weight of the article on the trough can be detected from the amount of the strains detected by the strain gauge mounted on the leaf spring, no extra weight detector is needed in the transport apparatus.

Also, in a preferred embodiment of the present invention, the amplitude detector may comprise at least one strain gauge mounted on the leaf spring for detecting an amount of strains developed in the leaf spring, and an amplitude detecting circuit for detecting the amplitude on the basis of the amount of strains detected by the strain gauge. This makes it possible to dispense with any extra amplitude detector since the weight of the article on the trough and the amplitude of vibration of the trough can be detected from the amount of strains detected by the strain gauge mounted on the leaf spring.

The present invention furthermore provides a method of detecting a vibrating characteristic of a vibrating transport apparatus. This method comprises the steps of transporting an article by vibrating a leaf spring, supporting therethrough on a base a trough on which the article is placed, with a vibrator, detecting a weight of the article on the trough and an amplitude of vibration of the leaf spring, and generating a data representative of a relation between a frequency of vibration of the trough and the detected amplitude with the weight taken as a parameter. With this method, the data representative of the relation between the vibrating frequency of the vibrator and the amplitude of vibration of the leaf spring detected by the amplitude detector can be automatically generated during operation of the vibrating transport apparatus, the data so generated being successively stored in the storage means.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings:

FIG. 2A is a schematic side view, on an enlarged scale, of one of leaf springs employed in the vibrating feeder of FIG. 1, showing the manner of elastic deformation thereof;

FIG. 2B is a schematic front elevational view, on an enlarged scale, of the leaf spring, showing the mounting of strain gauges on the leaf spring;

FIG. 3 is a circuit diagram showing a bridge circuit and a weight detecting circuit both employed in the vibrating feeder of FIG. 1;

FIG. 16 is a diagram showing the sequence of generation of data on the vibrating characteristic of the vibrating feeder according to the thirteenth embodiment of the present invention;

FIG. 17 is a diagram showing an example of data on the vibrating characteristic stored in the data storage means employed in the vibrating feeder according to the thirteenth embodiment of the present invention.

DETAILED DESCRIPTION OF THE EMBODIMENTS

Figure 1:
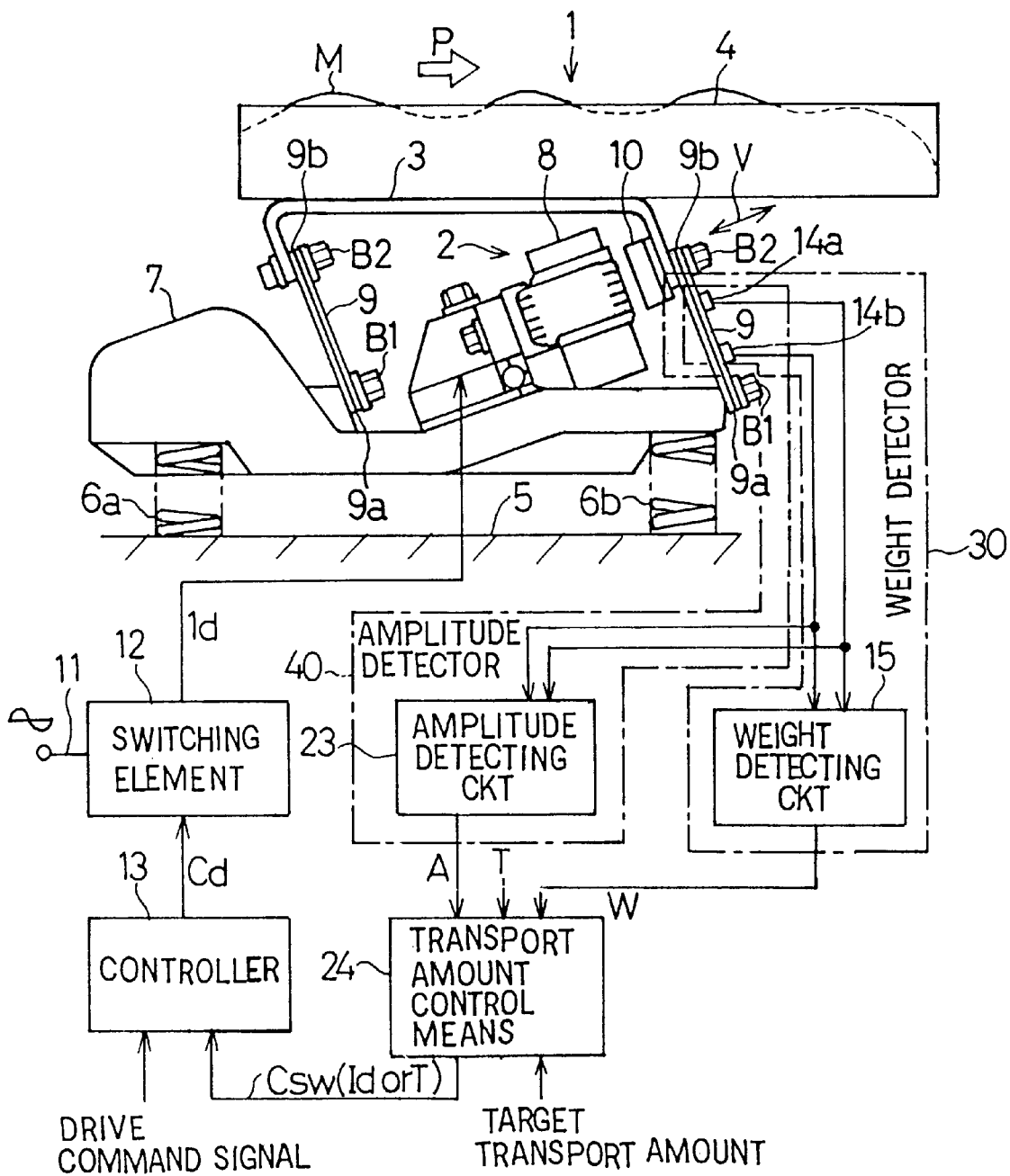
FIG. 1 is a diagram showing the structure of a vibrating feeder according to a first preferred embodiment of the present invention, shown together with a circuit block diagram.

A first preferred embodiment of the present invention will be described with particular reference to FIGS. 1 to 4. Referring first to FIG. 1 showing a schematic side view of a vibrating feeder 1 which forms a part of the vibrating transport apparatus of the present invention, the vibrating feeder 1 is mounted on a machine framework 5 and comprises a vibrator 2 and a trough 4 connected to the vibrator 2 through a bracket 3. The vibrator 2 includes a base 7 mounted on the machine framework 5 through a plurality of elastic members 6a and 6b which may be, for example, rubber blocks or coil springs and which serve as a vibration damper or vibration immunity support, an electromagnet 8 mounted on the base 7, front and rear leaf springs 9 extending parallel to each other and interposed between the trough 4 and the base 7, and a movable iron core 10 fixedly mounted on the bracket 3 in face-to-face relation with the electromagnet 8.

The front leaf spring 9 has a lower end 9a rigidly connected with a front portion of the base 7 by means of set bolts B1 and the opposite upper end 9b rigidly connected with a front portion of the bracket 3 by means of set bolts B2 and, likewise, the rear leaf spring 9 has a lower end 9a rigidly connected with a rear portion of the base by means of set bolts B1 and the opposite upper end 9b rigidly connected with a rear portion of the bracket 3 by means of set bolts B2. The movable iron core 10 on the bracket 3 is fixed to the bracket 3 at a location aligned with or adjacent the upper end 9b of the front leaf spring 9 so as to confront the electromagnet 8 to which an electric power can be supplied from a commercial A.C. power source 11 through a switching element 12.

The switching element 12 supplies to the electromagnet 8 an A.C. drive current having a frequency fd and a current quantity Id both dependent on a control command signal Cd outputted from a controller 13, so that while the trough 4 maintains a horizontal position the trough 4 can be vibrated in a direction shown by the arrow V at an amplitude A determined by the magnetic force of attraction between the electromagnet 8 and the movable iron core 10 and the spring constant k of the leaf springs 9. When the trough 4 is so vibrated, articles M to be transported which are loaded on the trough 4 can be transported horizontally in a predetermined vibrating direction shown by the arrow P.

The natural frequency fn of the vibrating system of the configuration described above can be determined by the following equation:

$$fn=(½\pi)\cdot(k/m)^{1/2} m=(m1 \times m2)/(m1+m2)$$

wherein k represents the spring constant, m1 represents the spring upper weight and m2 represents the spring lower weight.

The vibrating transport apparatus according to the first preferred embodiment of the present invention is so designed and so structured that the natural frequency fn of vibration of the trough 4 is set to be of a value close to the frequency of the commercial A.C. power source to thereby allow the trough 4 to be vibrated at a high amplitude with a minimized electric power.

As best shown in FIG. 2B, four strain gauges 14a, 14b, 14c and 14d are fixedly mounted on one of the front and rear leaf springs, for example, the front leaf spring 9 on a downstream side with respect to the direction P of transport of the articles M. Specifically, the strain gauges 14a and 14c are positioned on an upper mounting portion U of the front leaf spring 9 at respective location adjacent mounting holes H2 through which the set bolts B2 extend to secure that upper end 9b of the front leaf spring 9 to the bracket 3, whereas the strain gauges 14b and 14d are positioned on a lower mounting portion U of the front leaf spring 9 at respective locations adjacent mounting holes H1 through which the set bolts B1 extend to secure the lower end 9a of the front leaf spring 9 to the base 7. It is to be noted that each of the upper and lower portions U of the front leaf spring 9 is where when the leaf springs 9 are vibrated in a manner as will be described later, a relatively large elastic deformation takes place. In other words, the front and rear left springs 9, the bracket 3 and the base 7 altogether form a Roberval parallel motion mechanism in which they undergo deformation while keeping the shape of parallelogram and, therefore, when the upper end 9b of the leaf spring 9 swings about the fulcrum defined by the lower end 9a thereof as shown in FIG. 2A, the upper and lower mounting portions U of the front leaf spring 9 adjacent the respective set bolts B2 and B1 yield considerably to generate large strains. The amount of the strains so generated is associated with the vibration energies applied from a vibrator 2 to the leaf springs 9 and the total weight of the trough 4 and the articles M thereon, which is loaded on the leaf springs 9. The amount of the strains detected by the strain gauges 14a to 14d is inputted to a weight detecting circuit 15 shown in FIG. 1 so that the weight W of the articles M on the trough 4 can be detected by subtracting, as a tare weight, the known apparatus weights such as the weight of the bracket 3, the weight of the trough 4 and the weight of the movable iron core 10. Thus, the strain gauges 14a to 14d and the weight detecting circuit 15 altogether constitute a weight detector 30.

The strain gauges 14a and 14b and an amplitude detecting circuit 23 altogether constitute an amplitude detector 40 for detecting an amplitude A of vibration of the trough 4 in the direction of transport of the articles M from respective amounts of strains detected by the strain gauges 14a and 14b. It is to be noted that for the detection of the amplitude, strain gauges separate from the strain gauges 14a to 14d may be mounted at respective portions where relatively large elastic strains are produced.

FIG. 2B illustrates a front elevational view of the front leaf spring 9, showing the arrangement of the strain gauges 14a to 14d thereon. As shown therein, the front leaf spring 9 is of a substantially rectangular shape having the opposite lower and upper ends 9a and 9b, and the mounting holes H1 referred to hereinbefore are defined in the lower end 9a of the front leaf spring 9 for the passage of the respective set bolts B1 therethrough and the mounting holes H2 also referred to hereinbefore are defined in the upper end 9b of the front leaf spring 9 for the passage of the respective set bolts B2 therethrough. The strain gauges 14a and 14c are bonded by the use of a bonding agent to respective portions of the front leaf spring 9 adjacent the mounting holes H2 and displaced closer to a portion intermediate of the length of the front leaf spring 9 and, likewise, the strain gauges 14b and 14d are bonded by the use of a bonding agent to respective portions of the front leaf spring 9 adjacent the mounting holes H1 and displaced closer to the intermediate portion of the front leaf spring 9. The strain gauges 14a to 14d have respective output lead lines 16a, 16b, 16c and 16d which form a bridge circuit 17 as shown in FIG. 3. It is to be noted that the output lead lines 16a to 16d altogether form a flexible flat cable 16.

FIG. 3 illustrates the bridge circuit 17 and the weight detecting circuit 15, both of which form respective parts of the weight detector 30. The weight detecting circuit 15 includes first to fourth integrators 19a, 19b, 19c and 19d, first and second voltage dividers 20 and 21, and a signal processing circuit 22. The bridge circuit 17 has four junctions a, b, c and d; the junction c between the strain gauges 14a and 14c that is connected with a D.C. constant voltage power source 18, the junction d between the strain gauges 14b and 14d that is grounded, the junction a between the strain gauges 14a and 14b that is connected with the first integrator 19a, and the junction b between the strain gauges 14c and 14d that is connected with the second integrator 19b. The first voltage divider 20 comprised of a series circuit of resistors R1 and R2 and the second voltage divider 21 comprised of a series circuit of resistors R3 and R4 are connected between the junction c and the ground. A junction between the resistors R1 and R2 forming the first voltage divider 20 is in turn connected with the third integrator 19c to supply an output voltage of the first voltage divider 20 to the third integrator 19c, whereas a junction between the resistors R3 and R4 forming the second voltage divider 21 is in turn connected with the fourth integrator 19d to supply an output voltage of the second voltage divider 21 to the fourth integrator 19d. The signal processing circuit 22 is fed with a voltage VC appearing at the junction c, a ground potential at the junction d, respective output voltages Va and Vb from the first and second integrators 19a and 19b, a common voltage Vcom from the third integrator 19c and a reference voltage Vref from the fourth integrator 19d so that the weight W of the articles M on the trough 4 can be calculated. The weight W of the articles M on the trough 4 is calculated in terms of the average value of vibrating weight signals obtained through the bridge circuit 17.

Figure 4:
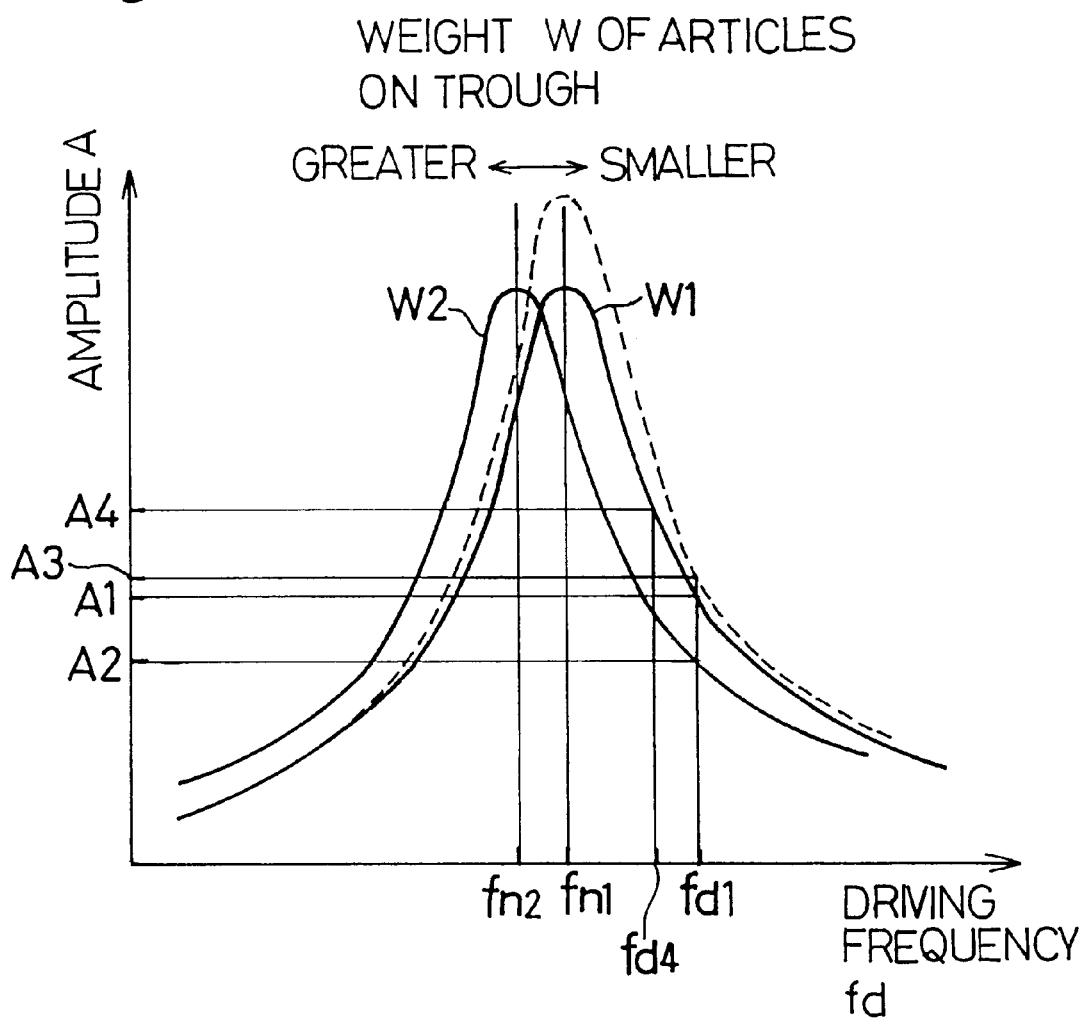
FIG. 4 is a characteristic chart showing a relationship between the vibrating frequency of a vibrating system in the present invention and the amplitude of vibration of the leaf spring.

FIG. 4 illustrates a graph showing a vibrating characteristic of the vibrating system employed in the first preferred embodiment of the present invention. Since as hereinbefore discussed the natural frequency fn of vibration is determined by the spring constant k of the leaf spring 9, the spring upper weight m1 and the spring lower weight m2, the natural frequency fn changes is with change of the weight W of the articles M on the trough 4 and, as shown in FIG. 4, the natural frequency fn changes from a value fn1 to a different value fn2 as the weight W increases from a value W1 to a greater weight W2. For this reason, even though the driving frequency remain at the same value fd1, the amplitude A of vibration decreases from a value A1 down to a lower value A2.

On the other hand, the amplitude A of vibration of the leaf spring 9 changes with the magnitude of a driving current Id and the driving frequency fd, and as the driving current Id increases or the driving frequency fd approaches a value equal to the natural frequency fn of vibration, the amplitude A increases.

By way of example, if the driving current Id increases even though the driving frequency Id does not change, a vibration characteristic curve will exhibit a shape shifted upwardly as shown by the broken line in FIG. 4 with the amplitude A increasing from a value A1 to a higher value A3.

Also, if even though both of the driving frequency fd1 and the driving current Id do not change, the weight W of the articles M on the trough 4 increases from a value W1 to a greater value W2 accompanied by lowering of the natural frequency of vibration from a value fn1 down to a lower value fn2, the amplitude A decreases from a value A1 down to a value A2.

The inventor of the present invention has conducted a series of experiments and has as a result thereof found that the amount Sw of transport by the vibrating feeder 1 is determined by an equation: (The weight W of the articles on the trough)×(The amplitude A of the leaf spring)×(The duration during which vibration takes place)×(A coefficient). Accordingly, adjustment of one of those parameters can result in adjustment of the amount Sw of transport. The coefficient employed in the equation is used to compensate for a deviation in angle between the direction V of vibration of the leaf spring 9 and the transport direction P of the articles M, a difference in slippage dependent on the articles M to be transported or the like and can be determined empirically. It is to be noted that the amplitude of vibration of the trough 4 in the direction P of transport can be regarded as the amplitude of the leaf spring 9, in which case since the leaf spring 9 is inclined relative to the direction orthogonal to the leaf spring 9, the direction of vibration of the leaf spring 9 will not coincide with the direction P of transport and, therefore, the amplitude in the direction of vibration of the leaf spring 9 and the amplitude in the direction P of transport differ from each other. The difference between these amplitudes can be compensated for by the coefficient referred to hereinabove.

Referring back to FIG. 1, the amplitude detecting circuit 23 and the weight detecting circuit 15 are connected with a transport amount control means 24. This transport amount control means 24 calculates the transport amount Sw based on the amplitude A inputted from the amplitude detecting circuit 23, the weight W of the articles and the length of time T of transport (hereinafter referred to as the transport time length T), (that is, the duration during which the vibrator 2 is operated) which is either detected by the amplitude detecting circuit 23 or determined from the duration of a control signal Cd outputted from a controller 13 and outputs to the controller 13 a transport amount control signal Csw which is utilized to compensate for a difference between the transport amount Sw and a target transport amount by adjustment of the amplitude A or the transport time length T. The controller 13 serves to adjust the firing angle of the switching element 12 to adjust the driving current Id to thereby control the amplitude A to be equal to a commanded amplitude or to thereby control the duration T of operation of the vibrator 2 to be equal to an instructed duration. By way of example, referring to FIG. 4, if the driving current Id is increased while the driving frequency and the weight are fd1 and W1, respectively, the vibration characteristic curve will exhibit such a shape as shifted upwardly as shown by the broken line with the amplitude A increasing to a value A3 in proportion to the driving current Id. On the other hand, if the weight changes from the value W1 to the greater value W2, the natural frequency of vibration will decrease from the value fn1 down to the value fn2, accompanied by reduction of the amplitude A from the value A1 down to the value A2.

According to the first preferred embodiment of the present invention, the weight W of the articles M on the trough 4 can be detected by the use of the strain gauges 14a to 14d mounted on the leaf spring 9 and no extra load cell is needed for this purpose. Accordingly, the vibrating transport apparatus as a whole can be simplified in structure and fabricated compact.

Also, since the weight W of the articles 4 on the trough 4 be detected directly with the transport amount Sw consequently determined accurately on a real time basis and the amount of transport by the vibrating feeder 1 can therefore be controlled based on the determined transport amount Sw, the response is high and, accordingly the transport amount can be controlled highly accurately.

In addition, since the transport amount can be adjusted from an initial data of weight measurement obtained at the start-up of operation of the vibrating feeder 1, no trial run is required, resulting in increase of the operativity of the vibrating transport apparatus.

It is to be noted that in the foregoing preferred embodiment of the present invention the four strain gauges 14a to 14d have been used as mounted on the leaf spring 9 to form the bridge circuit 17 so that a temperature-dependent change and an error in weight measurement which would result from twisting can be compensated for. However, where such a high accuracy of weight measurement is required, the use may be made of a single strain gauge, in which case the single strain gauge should be mounted on a portion of the leaf spring where a considerable amount of strains can be produced when deformed, so that detection of the strains so produced can be utilized to detect the weight of the articles on the trough.

Figure 5:
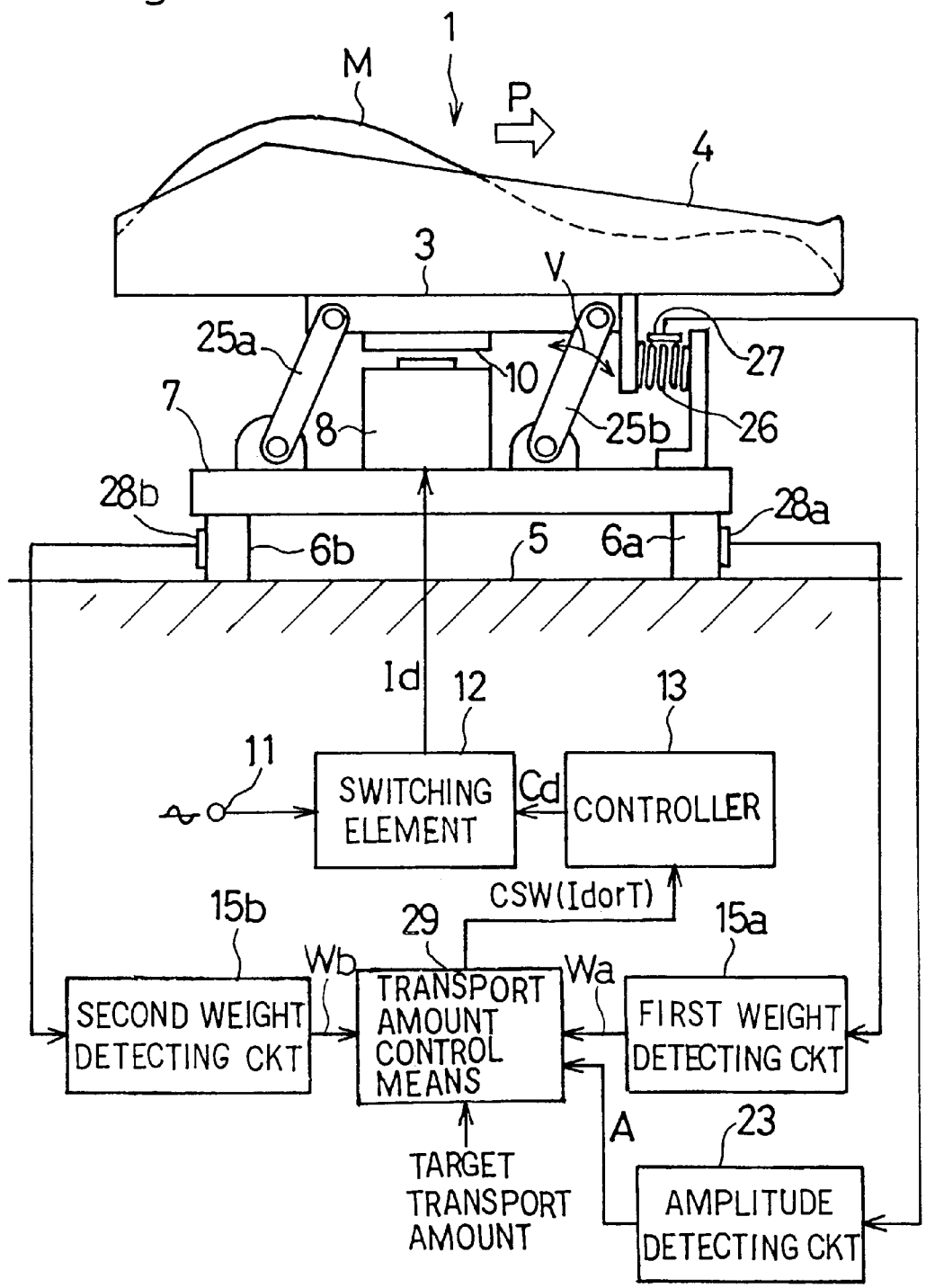
FIG. 5 is a diagram showing the structure of a vibrating feeder according to a second preferred embodiment of the present invention, shown together with a circuit block diagram.

The vibrating feeder according to a second preferred embodiment of the present invention is shown in FIG. 5. In FIG. 5, component parts similar to those shown in FIG. 1 are designated by like reference numerals and, therefore, details thereof are not reiterated for the sake of brevity. In this second preferred embodiment, in place of the front and rear leaf springs 9 employed in the foregoing embodiment of the present invention, rear and front parallel links 25a and 25b are employed to connect the trough 4 to the base 7 for movement relative to the base while the trough 4 is elastically supported by a coil spring 26 for movement in a direction conforming to the direction P of transport, that is, in a direction conforming to the direction of vibration of the trough 4. In addition, the electromagnet 8 is fixedly mounted on the base 7 and the movable iron core 10 is fixedly secured to the bracket 3 at a location above the electromagnet 8 to allow the latter to electromagnetically attract the movable iron core 10 to enable the trough 4 to be vibrated. A strain gauge 27 is fitted to a portion of the coil spring 26 where an elastic strain is developed as a result of vibration of the trough 4, so that the amplitude detecting circuit 23 can detect the amount of strains detected by the strain gauge 27 to eventually determine the amplitude A of vibration of the trough 4.

Of the plural elastic members made of a rubber material and interposed between the base 7 and the machine framework 5 so as to elastically support the base 7 above the machine framework 5, the front and rear elastic members 6a and 6b with respect to the direction of vibration of the trough 4 are provided with respective strain gauges 28a and 28b at a location where strains are apt to be developed. Thus, the strain gauges 28a and 28b provide respective signals indicative of the amounts of strains detected thereby, which are supplied to first and second weight detecting circuits 15a and 15b. The first and second weight detecting circuits 15a and 15b detect respective loads Wa and Wb, acting on the front and rear elastic members 6a and 6b, in reference to the amounts of the strains detected by the associated strain gauges 28b and 28a.

The first and second weight detecting circuits 15a and 15b are connected with a transport amount control means 29. In response to the loads Wa and Wb supplied respectively from the first and second weight detecting circuits 15a and 15b, the transport amount control means 29 performs a calculation of $[W=(Wa+Wb)/2]$ to determine the weight W of the articles M on the trough 4 and also detects a bias of the articles M on the trough 4 from a difference between the loads Wa and Wb. At the same time, since the transport amount control means 29 is connected with the amplitude detecting circuit 23, the transport amount control means 29 makes use of the weight W of the articles M on the trough 4, the bias of the articles M on the trough 4 and the amplitude A to generate a transport amount control signal Csw required for the target transport amount, which is the amount of transport of the articles M corrected according to the bias of the articles M on the trough 4, to be attained.

The transport amount control signal Csw generated by the transport amount control means 29 is supplied to the controller 13 so that the electromagnet 8 can be driven through the switching element 12 to control the vibrating duration T or the amplitude A. By way of example, where the load Wa on the front elastic member 6a is greater than the load Wb on the rear elastic member 6b, since the transport amount would become excessive if the amplitude is increased, correction is made to control the vibrating duration T or the amplitude A to a value lower than that attained when the loads Wa and Wb are in equilibrium.

According to the second preferred embodiment of the present invention, not only is the amplitude A of vibration of the trough 4 detected in reference to the amount of strains detected by the strain gauge 27, but also the weight W of the articles M on the trough 4 and the extent of bias of the articles M on the trough 4 are detected in reference to the amounts of strains detected respectively by the strain gauges 28a and 28b, so that the amount of transport in which the bias is taken into consideration can be controlled. Accordingly, it is possible to accomplish a highly accurate transport amount control.

Figure 6:
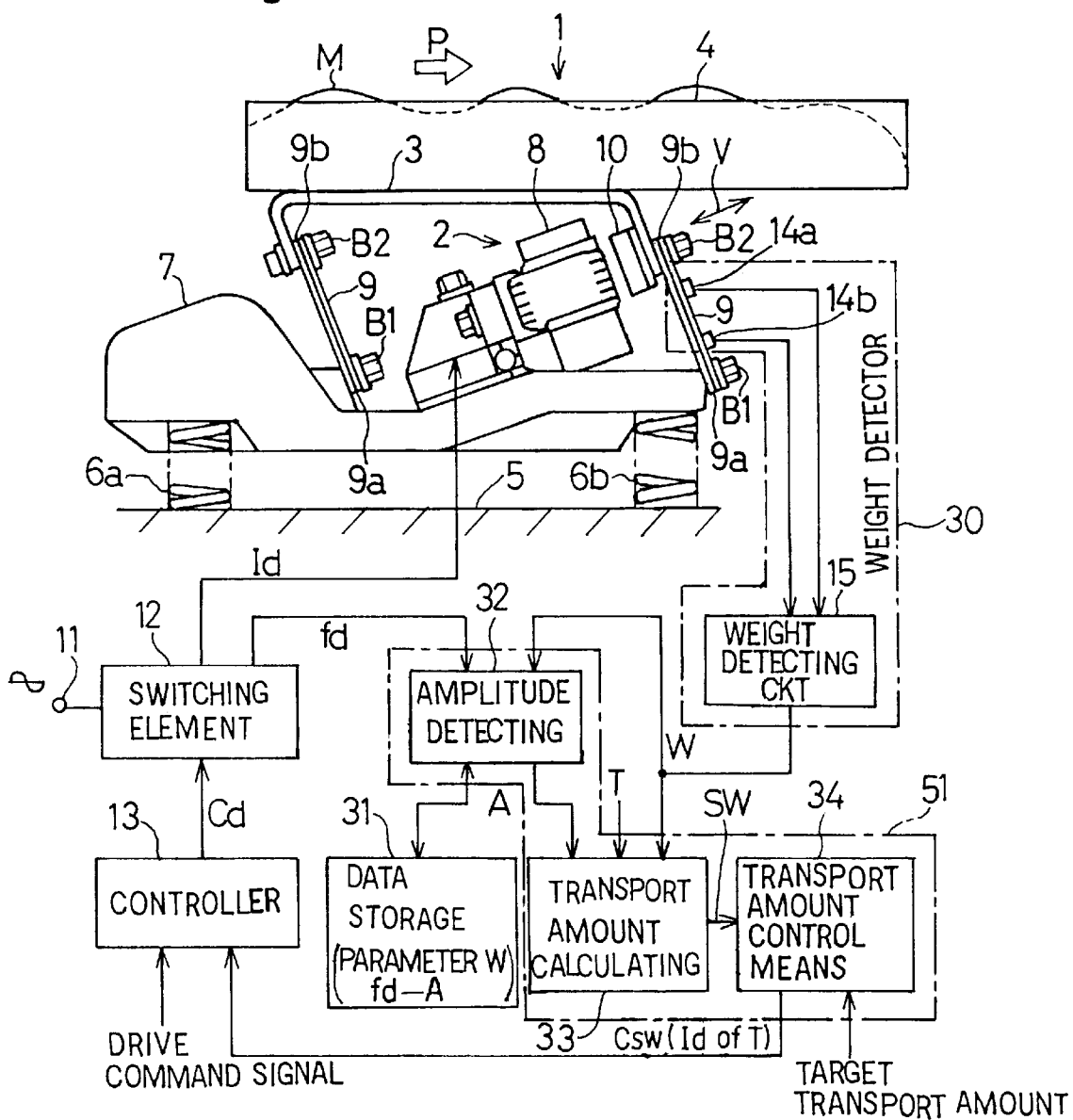
FIG. 6 is a diagram showing the structure of a vibrating feeder according to a third preferred embodiment of the present invention, shown together with a circuit block diagram.

FIG. 6 illustrates a diagram showing the structure of the vibrating feeder according to a third preferred embodiment of the present invention. In FIG. 6, component parts similar to those shown in FIG. 1 are designated by like reference numerals and, therefore, details thereof are not reiterated for the sake of brevity. In this third preferred embodiment of the present invention, the use is made of a data storage means 3 1and a transport control means 51 including an amplitude detecting means 32, a transport amount calculating means 33 and a transport amount control means 34. The data storage means 31 stores data concerning the driving frequency fd of the vibrator 2 and the amplitude A of the leaf spring 9 which are based on the weight of the articles on the trough 4 taken as parameters. These data can be determined by, for example, determining the weight W of the articles on the trough 4 in the manner described hereinbefore with the amplitude A being determined based on the respective amounts of strains detected by the strain gauges 14a to 14d, while the vibrating feeder 1 is actually driven to transport the articles through the trough 4. The driving frequency fd can be determined from, for example, the operating cycle of the switching element 12. Also the amplitude detecting means 32 is operable to output through the data storage means 31 the amplitude A corresponding to the weight W of the articles detected by the weight detector 30 and the driving frequency fd inputted from the switching element 12.

The transport calculating means 33 is operable to calculate the transport amount Sw on the basis of amplitude A inputted from the amplitude detecting means 32, the weight W of the articles inputted from the weight detector 30, and the transport time length (the operating duration of the vibrator 2) T which is either detected by the amplitude detecting means 32 or determined from the duration of the control signal Cd outputted from the controller 13.

The transport amount control means 33 is operable to output to the controller 13 a transport amount control signal Csw which is used to correct the difference between the inputted transport amount Sw and the target transport amount by adjusting either the amplitude A or the transport time length T. The controller 13 is operable, as is the case with that in the first embodiment of the present invention, to control the amplitude A to a required value by adjusting the firing angle of the switching element 12 to adjust the driving current Id or to control the operating time T of the vibrator 2 to a required value. By way of example, as has been explained in connection with FIG. 4, if the driving current Id is increased, the vibration characteristic curve will exhibit such a shape as shifted upwardly as shown by the broken line with the amplitude A increasing. On the other hand, if the weight W changes from the value W1 to the greater value W2, the natural frequency of vibration fn will decrease, accompanied by reduction of the amplitude A.

Even in this third preferred embodiment of the present invention, since the weight W of the articles 4 on the trough 4 be detected directly with the transport amount Sw consequently determined accurately on a real time basis and the amount of transport by the vibrating feeder 1 can therefore be controlled based on the determined transport amount Sw, the response is high and, accordingly the transport amount can be controlled highly accurately. In addition, since the data storage means 31 stores the date representative of the relation between the driving frequency fd and the amplitude A with the weight W of the articles on the trough 4 of the vibrating feeder taken as the parameter, adjustment of the transport amount can be accomplished from the initial weight measurement obtained at the time of start-up of the vibrating feeder. For this reason, no trial run is needed with the operativity of the vibrating feeder consequently increased.

Figure 7:
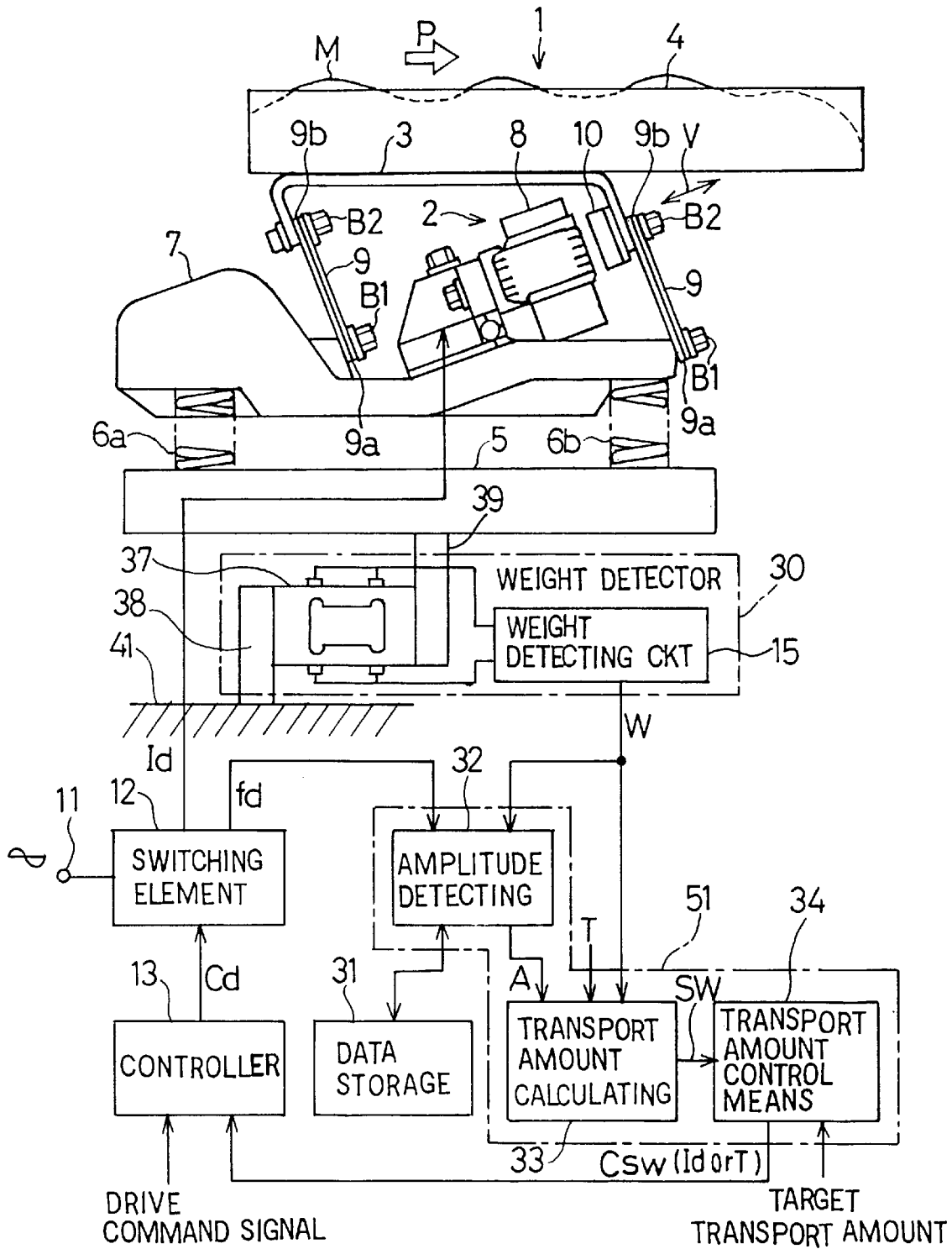
FIG. 7 is a diagram showing the structure of a vibrating feeder according to a fourth preferred embodiment of the present invention, shown together with a circuit block diagram.

A fourth preferred embodiment of the present invention is shown in FIG. 7. In FIG. 7, component parts similar to or identical with those shown in FIG. 6 are designated by like reference numerals and, therefore, details thereof are not reiterated for the sake of brevity. In this embodiment, the weight detector 30 is constructed with a load cell 37 and the weight detecting circuit 15. The load cell 37 has a fixed end and a movable end opposite to the fixed end and is supported with the fixed end fixedly secured to a holder block 41 through a support member 38 and with the movable end carried by the machine framework 5 through a support member 39 so that the total weight of the vibrating feeder 1 on the machine framework 5 can be born by the load cell 37. Other structural and functional features of the vibrating feeder 1 shown in FIG. 7 are substantially similar to those of the vibrating feeder 1 shown in the first preferred embodiment and, therefore, the details thereof are not reiterated for the sake of brevity.

Even with the fourth preferred embodiment of the present invention, as is the case with the third embodiment of the present invention shown in FIG. 6, the weight W of the articles 4 on the trough 4 be detected directly with the transport amount Sw consequently determined accurately on a real time basis and the amount of transport by the vibrating feeder 1 can therefore be controlled based on the determined transport amount Sw. Accordingly, the response is high and, accordingly the transport amount can be controlled highly accurately.

Figure 8:
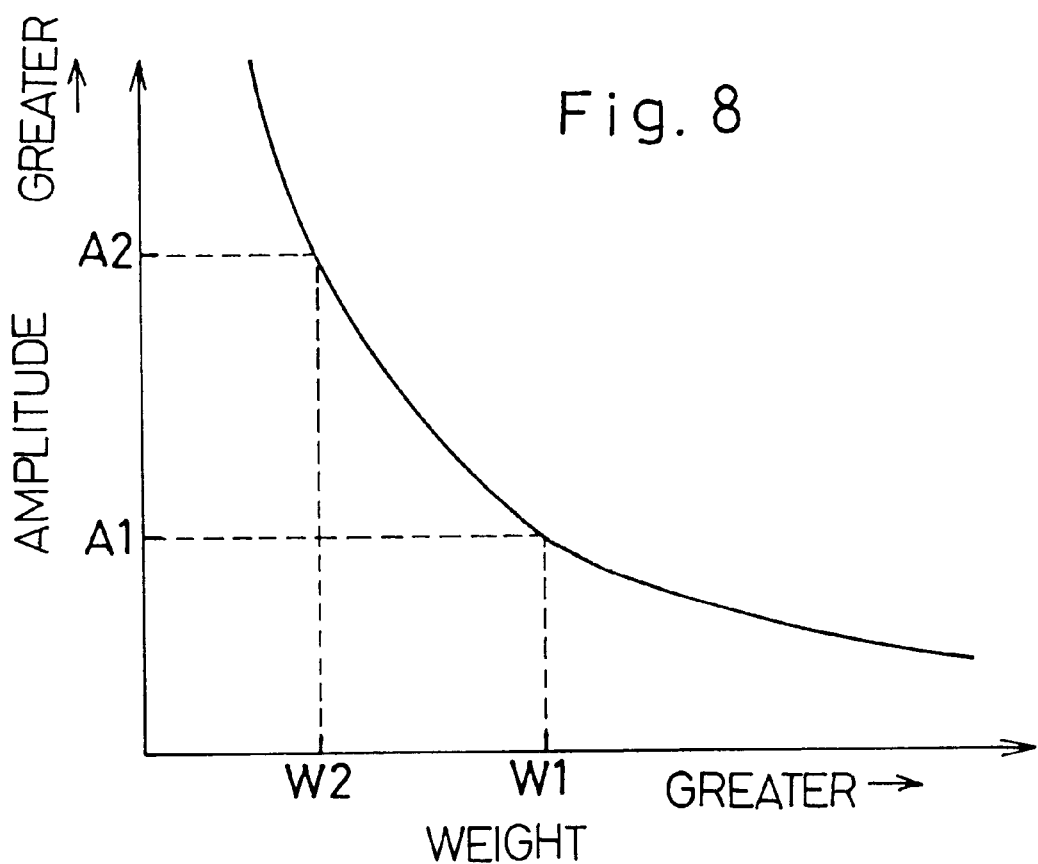
FIG. 8 is a diagram showing a weight versus amplitude characteristic stored in a data storage means employed in the vibrating feeder according to a fifth preferred embodiment of the present invention.

A fifth preferred embodiment of the present invention is directed to the vibrating feeder 1 which is similar in structure to that shown in FIG. 6 in connection with the third embodiment of the present invention, however it differs therefrom in that the amplitude detecting means 32 in the fifth embodiment of the present invention is so designed as to determine the amplitude A of the leaf spring 9 on the basis of the amplitude versus weight characteristic shown in FIG. 8. In other words, where the driving frequency fd of the vibrator 2 is fixed and the weight W of the articles M does not vary so much, no considerable error will occur even if the amplitude A is determined straight from the weight W. Accordingly, such an amplitude versus weight characteristic of the vibrating feeder 1 as shown in FIG. 8 is actually measured and is then stored in the data storage means 31 so that the amplitude detecting means 32 can read out the amplitude A corresponding to the weight W inputted from the weight detector 30, the transport amount calculating means 33 can calculate the transport amount Sw by the use of the weight W and the amplitude A both inputted thereto, and finally the transport amount control means 34 can output the transport amount control signal Csw therefrom.

Figure 9:
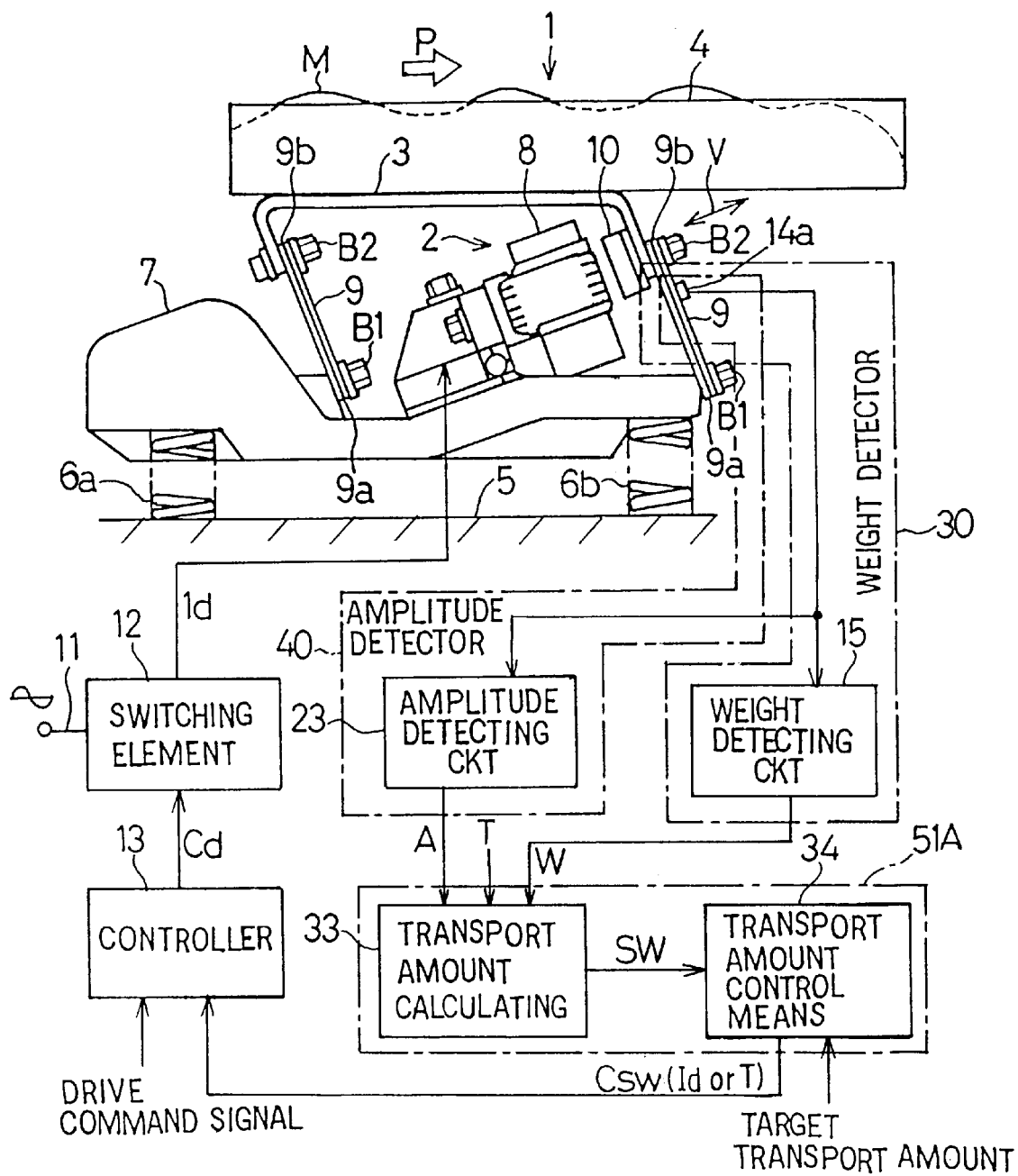
FIG. 9 is a diagram showing the structure of a vibrating feeder according to a sixth preferred embodiment of the present invention, shown together with a circuit block diagram.

In FIG. 9, there is shown the vibrating feeder according to a sixth preferred embodiment of the present invention. This sixth embodiment of the present invention is so designed as to determine not only the weight of the articles M on the trough 4, but also the amplitude of vibration of the leaf spring, by the use of the strain gauges as is the case with the first embodiment of the present invention. In FIG. 9, component parts similar to or identical with those shown in FIGS. 1 and 6 are designated by like reference numerals and, therefore, details thereof are not reiterated for the sake of brevity.

Referring now to FIG. 9, reference numeral 14a represents a strain gauge which is mounted on a portion of the leaf spring 9 where a considerable deformation takes place during vibration. While in the previously described first embodiment of the present invention the four strain gauges are mounted on the leaf spring to form the bridge circuit to thereby compensate for the temperature-dependent change and the weighing error which would result from twisting, the use of the single strain gauge 14a is sufficient where no high weighing accuracy is required. Thus, in the sixth embodiment of the present invention now under discussion, the single strain gauge 14a is mounted on that portion of the leaf spring 9 where the considerable deformation takes place during vibration, to provide allow the single strain gauge 14a to detect the amount of strains developed in the leaf spring 9 so that both of the weight W of the articles on the trough 4 and the amplitude A of the leaf spring 9 can be detected.

In the circuit shown in FIG. 9, the amplitude detector 40 is constitute by the strain gauge 14a and the amplitude detecting circuit 23 and is operable to detect the amplitude A of the leaf spring 9 on the basis of the amount of strains developed as a result of vibration of the strain gauge 14a. The amount of strains developed during the vibration of the strain gauge 14a corresponds to the amount of deformation of the leaf spring 9. The respective operations of the transport amount calculating means 33 and the transport amount control means 34 both forming a transport amount control means 51A are substantially similar to those employed in the third embodiment of the present invention shown in FIG. 6 and, therefore, the details thereof are not reiterated for the sake of brevity.

According to the sixth embodiment of the present invention, not only can effects similar to those brought about by the third embodiment of the present invention be obtained, but an additional effect can also be obtained in that since no data storage means such as required in the third embodiment of the present invention is employed, the structure can be simplified. Even in this sixth embodiment of the present invention, the weight detector 30 may be employed in the form of a load cell similar to that employed in the fourth embodiment of the present invention.

Also, a means for detecting the amplitude of the trough (the amplitude of the leaf spring) may not be always limited to the strain gauge, but may be employed in the form of an optical detecting means or an electric detecting means.

Figure 10:
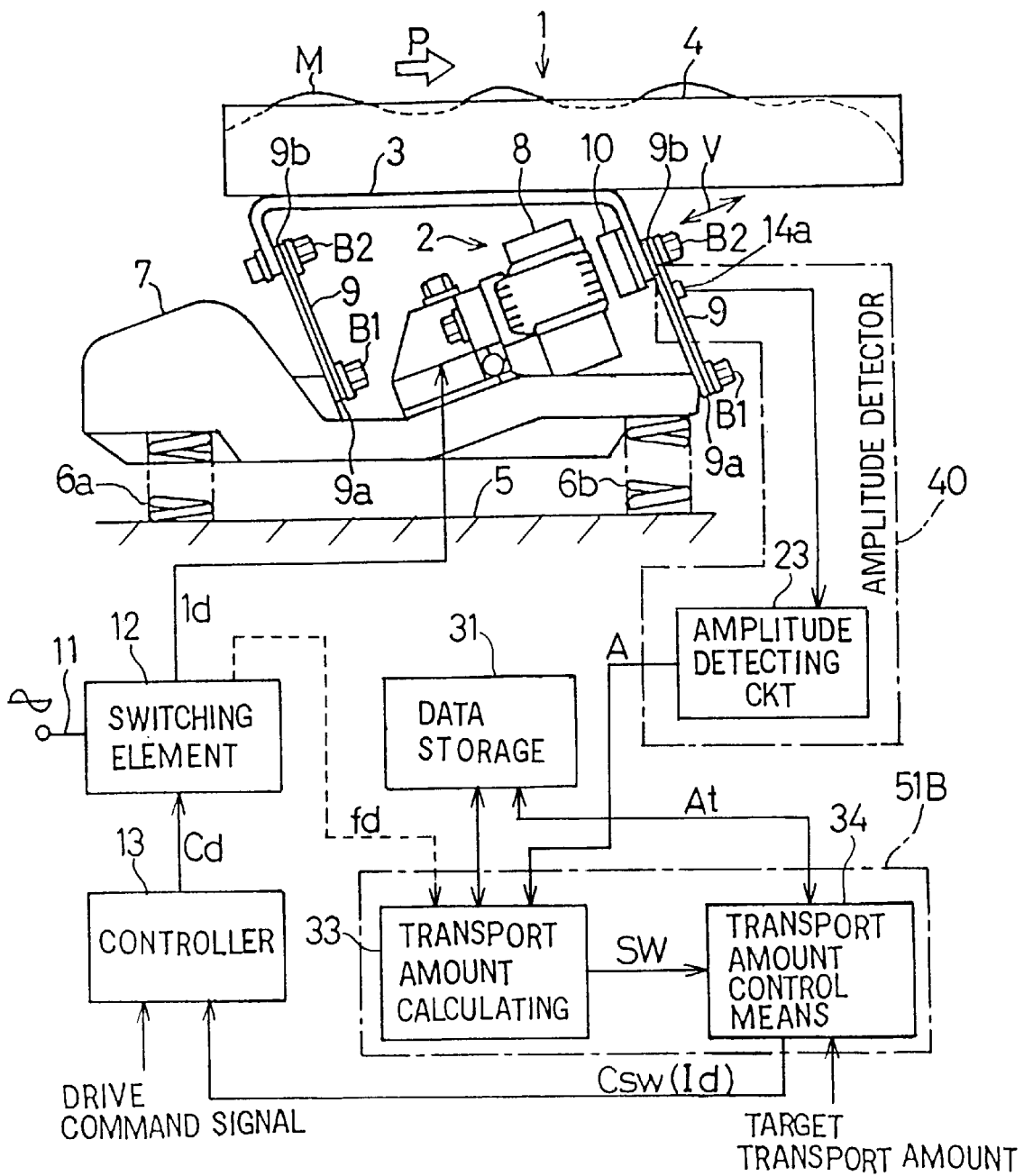
FIG. 10 is a diagram showing the structure of a vibrating feeder according to seventh and eighth preferred embodiments of the present invention, shown together with a circuit block diagram.

FIG. 10 illustrates the vibrating feeder according to a seventh preferred embodiment of the present invention. In FIG. 10, component parts similar to or identical with those shown in FIGS. 1 and 6 are designated by like reference numerals and, therefore, details thereof are not reiterated for the sake of brevity. In this seventh preferred embodiment of the present invention, the weight W of the articles on the trough 4 is determined based on the amplitude versus weight characteristic shown in FIG. 8 in reference to the amplitude value detected by the amplitude detector 40 shown in FIG. 9. In other words, the data storage means 31 stores the relationship between the amplitude value A of the leaf spring 9 shown in FIG. 8 and the weight W of the articles on the trough 4, and the transport amount calculating means 33 reads out from the data storage means 31 the weight W corresponding to the amplitude A detected by the amplitude detector 40 and calculates the transport amount Sw.

The transport amount control means 34 compares the inputted transport amount Sw with the target transport amount to determine if the difference between the inputted transport amount Sw and the target transport amount exceeds a predetermined tolerance. In the event that the transport amount control means 34 determines that the difference exceeds the predetermined tolerance, the transport amount control means 34 reads out an amplitude value At, which will be used as the target transport amount, from the data storage means 31 and then supply to the controller 13 the transport amount control signal Csw with which the driving current Id of the vibrator 2 is changed to the driving current Id at which the amplitude of the leaf spring 9 can assume a value At. The transport amount calculating means 33 and the transport amount control means 34 altogether constitute the transport control means 51B.

According to the seventh embodiment of the present invention, the use of the weight detector can advantageously be dispensed with.

An eighth preferred embodiment of the present invention is such that in the structure shown in FIG. 10, the data storage means 31 stores a plurality of amplitude versus driving frequency characteristics in which the weight W of the articles on the trough 4 is used as a parameter, so that the transport amount calculating means 33 can calculate the transport amount Sw by reading the weight W of the articles which correspond to the amplitude value A, detected by the amplitude detector 40, and the driving frequency fd obtained from the switching element 12 or the like. The operation of the transport amount control means 34 to control the driving current Id is substantially similar to that performed in the previously described seventh embodiment of the present invention.

According to this eighth embodiment of the present invention, the use of the weight detector can advantageously be dispensed with and, also, the vibrating feeder can be controlled highly accurately.

Figure 11:
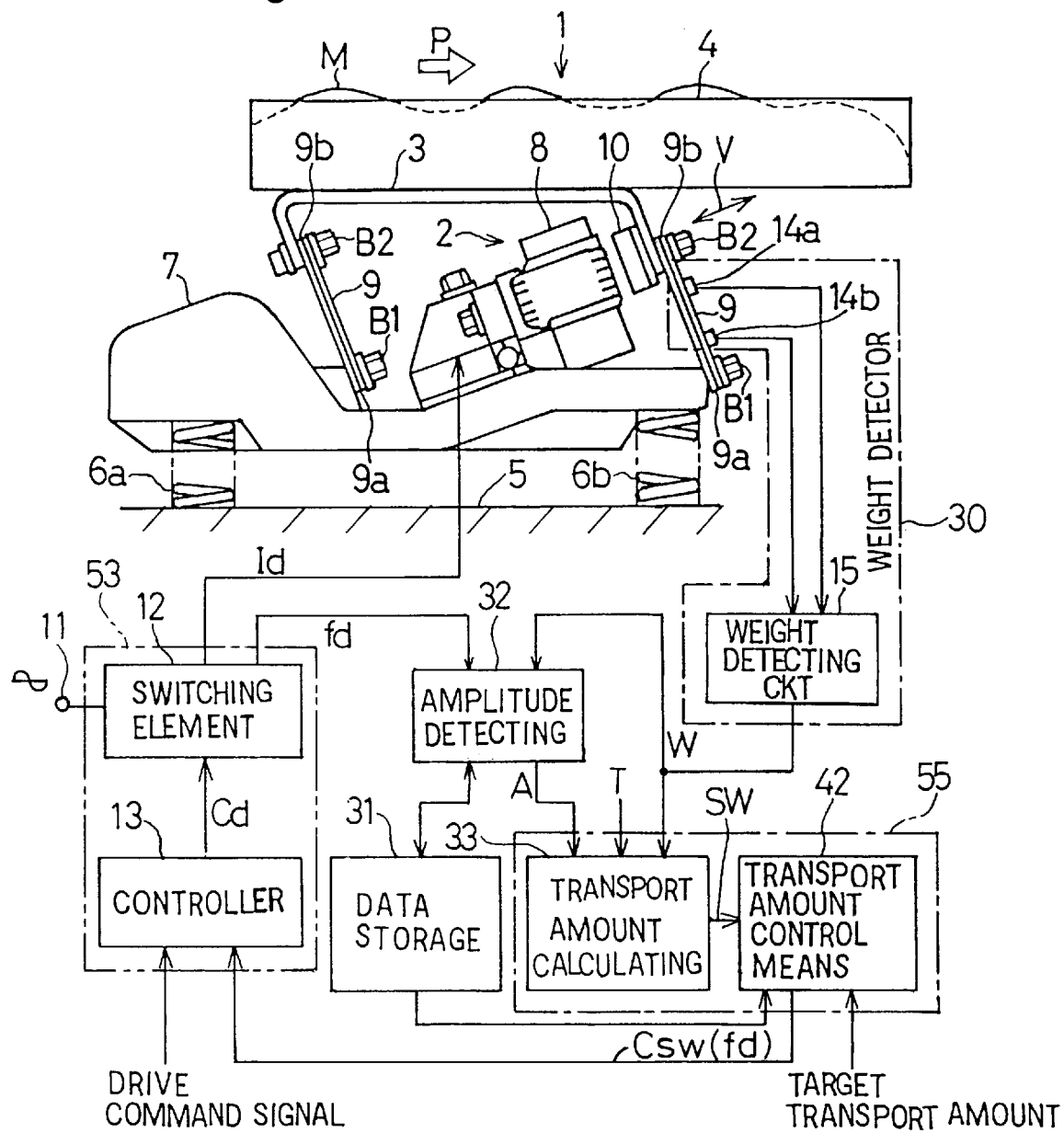
FIG. 11 is a diagram showing the structure of a vibrating feeder according to a ninth preferred embodiment of the present invention, shown together with a circuit block diagram.

The driving feeder according to a ninth preferred embodiment of the present invention is shown in FIG. 11. In FIG. 11, component parts similar to or identical with those shown in FIG. 6 are designated by like reference numerals and, therefore, details thereof are not reiterated for the sake of brevity. In this ninth preferred embodiment of the present invention, the controlling operation of the transport amount control means 42 is such as to control the transport amount SW by changing the amplitude A of vibration of the trough 4 through adjustment of the driving frequency fd unlike the transport amount control means 34 employed in the third embodiment of the present invention.

More specifically, the switching element 12 and the controller 13 altogether constitute a current and frequency adjuster 53, similar to an inverter, for adjusting the frequency and the driving current, and the transport amount calculating means 33 and the transport amount control means 42 altogether constitute a frequency control means 55 for controlling the current and frequency adjuster 53. The transport amount control means 42 outputs the transport ansport amount control signal Csw for changing the driving frequency fd to the controller 13, and the controller 13 adjusts the frequency of selective opening and closing of the switching element 12, that is, the driving frequency to render the amplitude A to be of a value equal to the required amplitude. By way of example, referring back to FIG. 4, if the driving frequency fd is set to a value fd4 close to the natural frequency fn1 while the driving frequency is fd1 and the weight is W1, the amplitude increases to a value such as indicated by A4. Accordingly, where the transport amount is desired to be 1.2 times, the transport amount control means 42 reads from the data storage means 31 the driving frequency fd4 that is necessary to render the amplitude to be 1.2 times and then outputs to the controller 13 the transport amount control signal Csw necessary to set the driving frequency to attain the value fd4.

With the prior art vibrating feeder, it has often experienced that even though the supply of an electric drive power is interrupted there has been no way of avoiding an overrun of the articles, i.e., an excessive discharge of the articles from the trough 4. However, with the ninth embodiment of the present invention described above, the amplitude A of vibration of the trough 4 can be abruptly changed merely by changing the driving frequency fd with no need to change the electric drive power supplied to the vibrator 2. Hence, when the necessity occurs to abruptly brake the vibrating feeder 1, the driving frequency fd is changed to abruptly attenuate the amplitude A of vibration of the trough 4, followed by interruption of the supply of the electric drive power to the vibrator 2, wherefore the trough 4 can be effectively braked with high response. Accordingly, the control of supply of the articles towards weighing hoppers can be carried out with high accuracy.

According to the ninth embodiment of the present invention, since the weight W of the articles on the trough 4 can be detected directly and the driving frequency fd is changed based on the natural frequency characteristic stored in the data storage means to control the amplitude of vibration of the trough 4, the amplitude of vibration of the trough 4 can readily be shifted to a desired target amplitude and, hence, the transport control with high response can advantageously be accomplished.

While the natural frequency characteristics varies in dependence on the weight W of the articles on the trough 4, the amplitude A of vibration of the trough 4 is controlled based on the frequency characteristics dependent on the weight W of the articles thereby accomplishing an accurate transport control.

Also, since the vibrating frequency fd can be changed to attain a value close to the natural frequency, driving energies of the vibrator 2 can be utilized effectively.

Yet, since the data storage means 31 stores the date representative of the relation between the driving frequency fd and the amplitude A with the weight W of the articles on the trough 4 taken as the parameter, adjustment of the amount of transport of the articles can be effected from the start-up of operation of the vibrating feeder. For this reason, no trial run is needed, accompanied by increase in operativity of the vibrating feeder.

In the previously described ninth embodiment of the present invention the amplitude A is determined by the utilization of the different natural frequency characteristics in dependence on the weight W of the articles. It is, however, to be noted that where the extent to which the weight W changes is small, the data storage means 31 may store the data of the single natural frequency characteristic of a standard or average weight W so that it can be utilized in detecting the amplitude A.

Even in this ninth embodiment of the present invention, the weight detector 30 can be employed in the form of a load cell such as employed in the fourth embodiment of the present invention and shown in FIG. 7.

Figure 12:
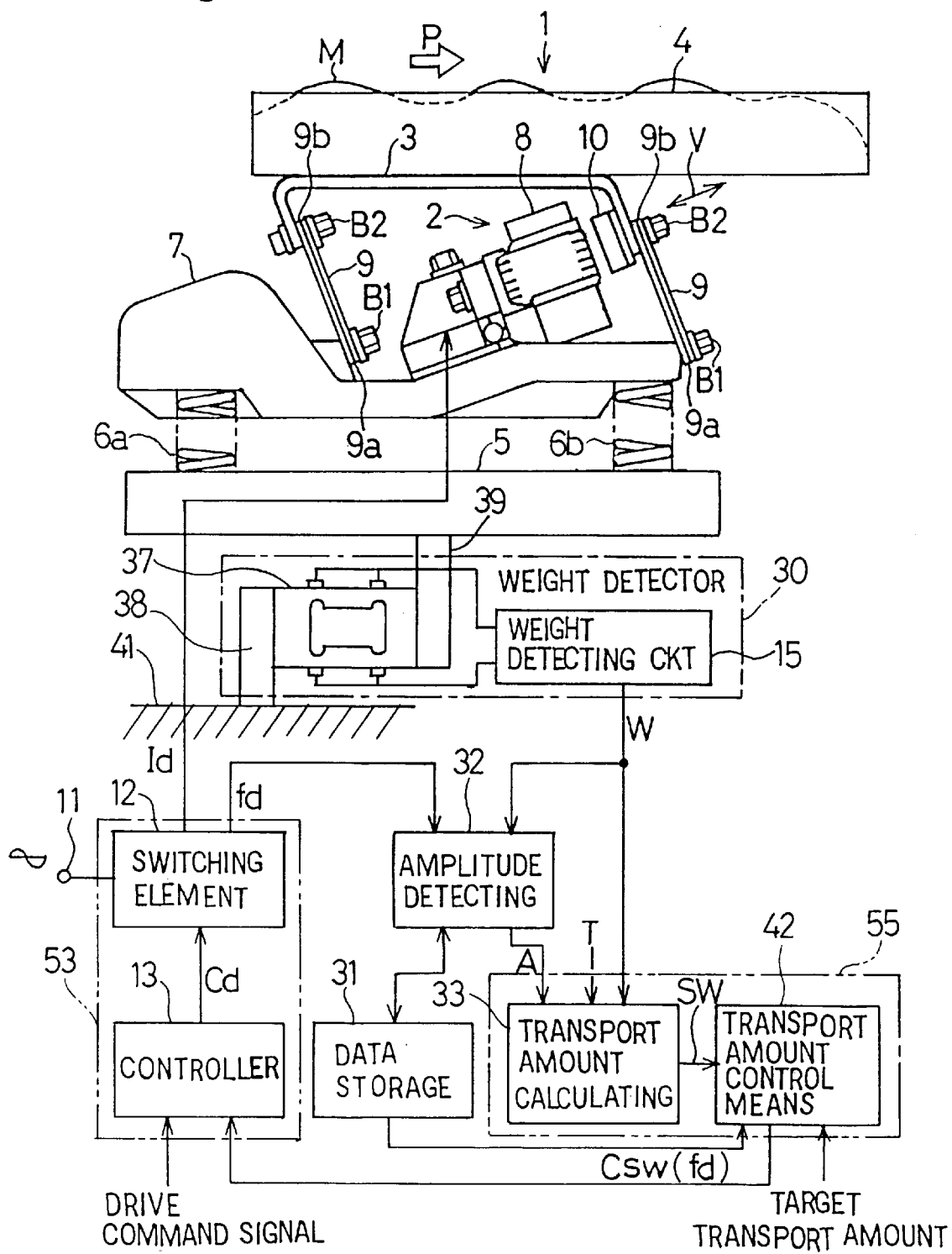
FIG. 12 is a diagram showing the structure of a vibrating feeder according to a tenth preferred embodiment of the present invention, shown together with a circuit block diagram.

FIG. 12 illustrates the vibrating feeder according to a tenth preferred embodiment of the present invention. In FIG. 12, component parts similar to or identical with those shown in FIG. 7 showing the fourth embodiment of the present invention are designated by like reference numerals and, therefore, details thereof are not reiterated for the sake of brevity. In this tenth preferred embodiment of the present invention, the controlling operation of the transport amount control means 42 is different from that of the transport control means 34 used in the fourth embodiment of the present invention and is so designed as to control the transport amount SW by changing the amplitude A of vibration of the trough through adjustment of the driving frequency fd.

Even with the tenth embodiment of the present invention, the transport amount Sw can be accurately obtained on a real-time basis along with energy saving and, also, the highly accurate control of the transport amount can be accomplished with high response. In addition, the operativity of the vibrating feeder can be enhanced with no need to perform the trial run.

Figure 13:
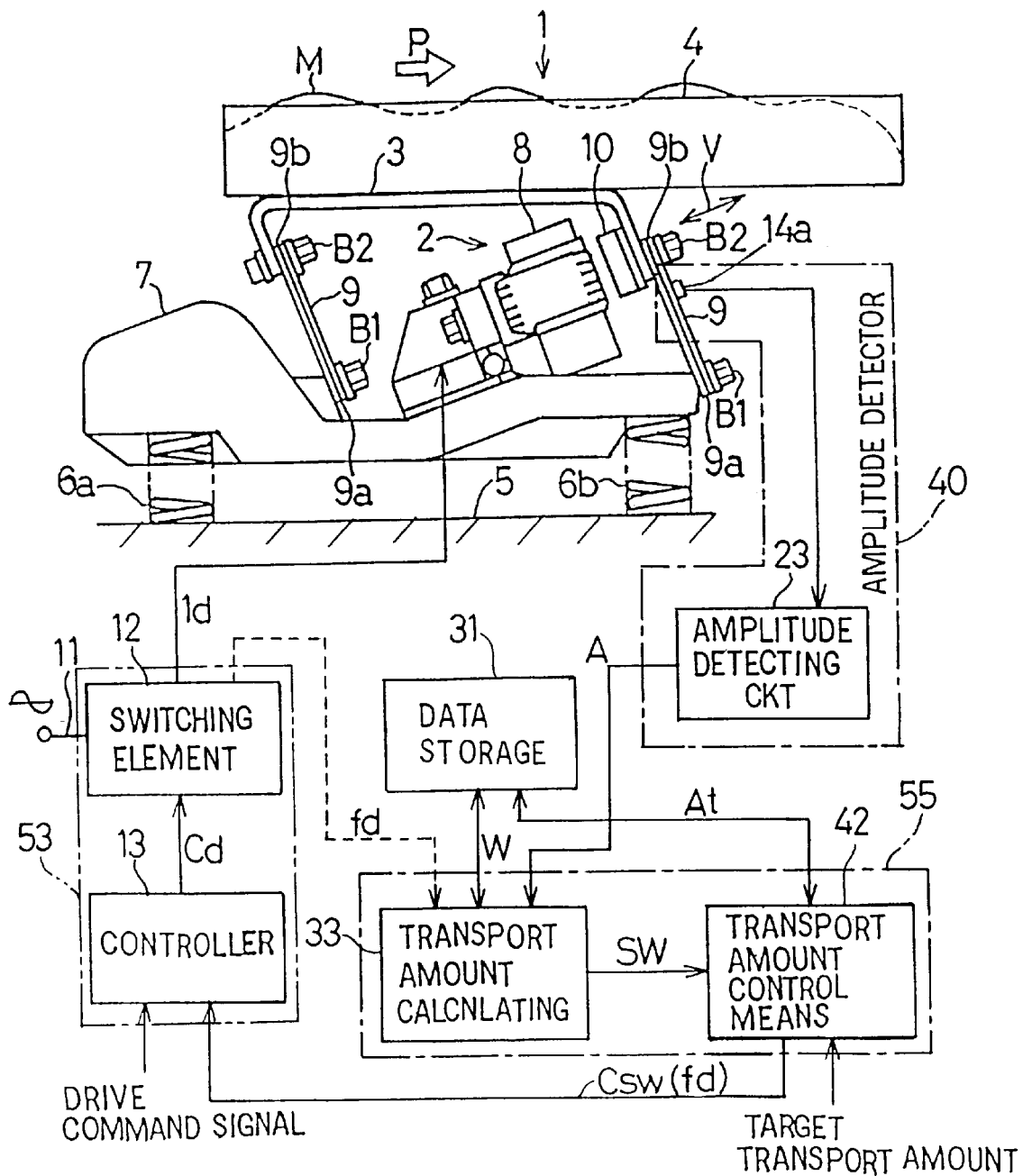
FIG. 13 is a diagram showing the structure of a vibrating feeder according to an eleventh preferred embodiment of the present invention, shown together with a circuit block diagram.

Referring to FIG. 13, there is shown the vibrating feeder according to an eleventh preferred embodiment of the present invention. In FIG. 13, component parts similar to or identical with those shown in FIG. 10 showing the seventh embodiment of the present invention are designated by like reference numerals and, therefore, details thereof are not reiterated for the sake of brevity. In this eleventh preferred embodiment of the present invention, the transport amount control means 42 is so designed as to compare the inputted transport amount SW with the target transport amount. Unlike the transport control means 34 employed in the seventh embodiment of the present invention, the transport amount control means 42 in the eleventh embodiment controls the transport amount SW in such a way as to adjust, in the event that as a result of comparison the difference between the inputted transport amount SW and the target transport amount exceeds a predetermined tolerance, the driving frequency fd to render the difference to fall within the predetermined tolerance to thereby change the amplitude A of vibration of the trough 4.

Even with the eleventh embodiment of the present invention, the transport amount Sw can be accurately obtained on a real-time basis along with energy saving and, also, the highly accurate control of the transport amount can be accomplished with high response. In addition, the operativity of the vibrating feeder can be enhanced with no need to perform the trial run.

Figure 14:
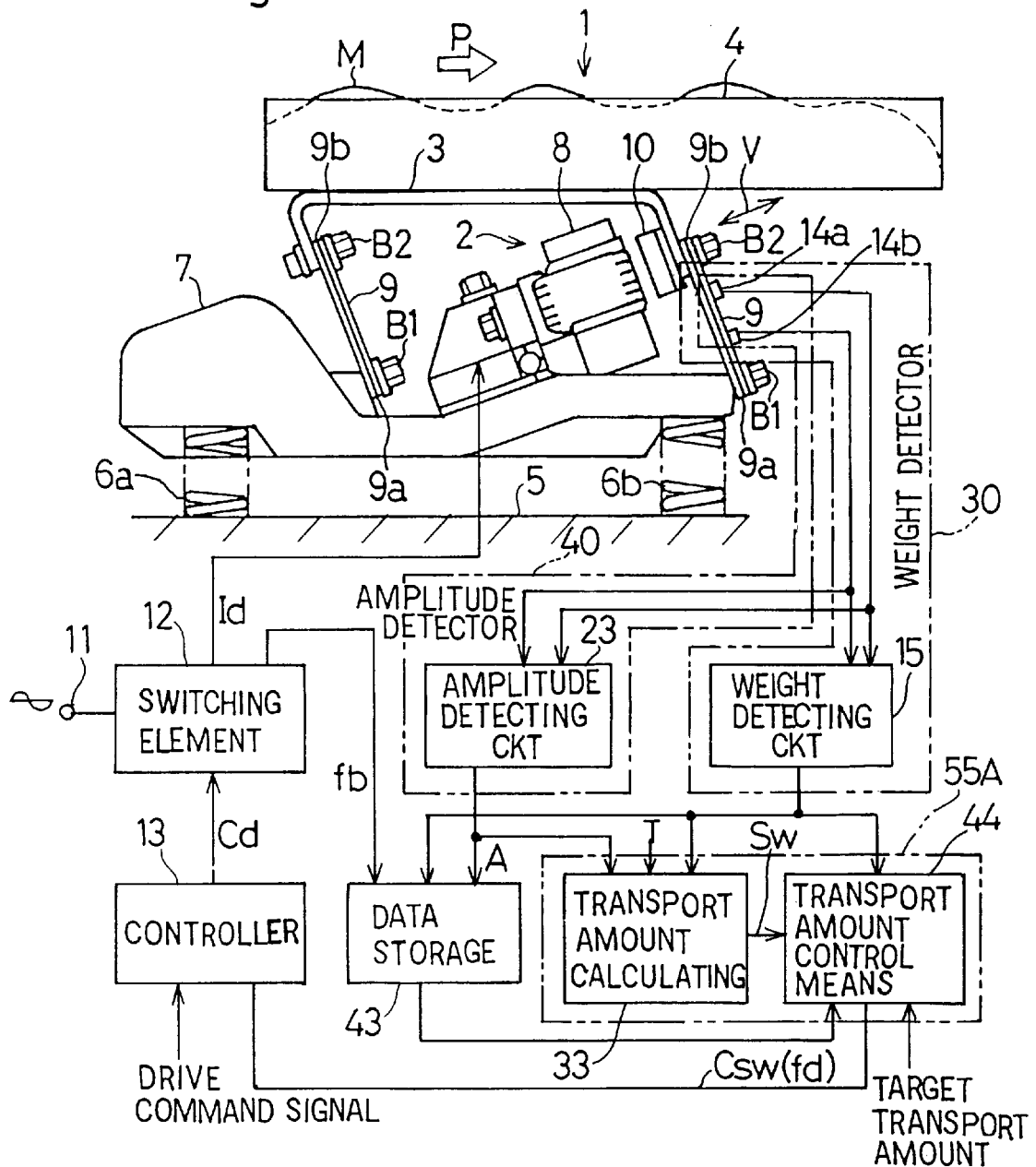
FIG. 14 is a diagram showing the structure of a vibrating feeder according to a twelfth preferred embodiment of the present invention, shown together with a circuit block diagram.

Referring to FIG. 14, there is shown the vibrating feeder according to a twelfth preferred embodiment of the present invention. In FIG. 14, component parts similar to or identical with those shown in FIG. 1 showing the first embodiment of the present invention are designated by like reference numerals and, therefore, details thereof are not reiterated for the sake of brevity. In this twelfth preferred embodiment of the present invention, the transport amount control means 44 forming a part of the frequency control means 55A together with the transport amount calculating means 33 is different from the transport control means 24 employed in the first embodiment of the present invention and is so designed as to adjust the driving frequency fd to change the amplitude A of vibration of the trough 4 to thereby control the transport amount SW. Also, unlike the data storage means 31 employed in any one of the foregoing embodiments, a data storage means 43 employed in the twelfth embodiment is operable to store, each time a new driving frequency fd is inputted from the switching element 12 or a newly detected amplitude value A is inputted from the amplitude detector 40, that is, each time a new data is inputted thereto, the inputted detected amplitude value A and the driving frequency fd in correspondence with the weight W inputted from the weight detector 30 and, in the event that they are found to be different from the data then stored in the data storage means 43, the data stored in the data storage means 43 is updated with the new data to thereby store a new resonance frequency characteristic (similar to the characteristic shown in FIG. 4) that is representative of the relation between the detected amplitude value A and the driving frequency fd in correspondence with the weight W.

According to the twelfth embodiment of the present invention, not only can effects similar to those brought about by the ninth embodiment shown in FIG. 11 be obtained, but a highly accurate transport amount control is possible in pursuit of change of the vibrating characteristic of the vibrating feeder with passage of time since the data stored in the data storage means 43 can be updated each time the vibrating characteristic of the vibrating feeder changes.

Figure 15:
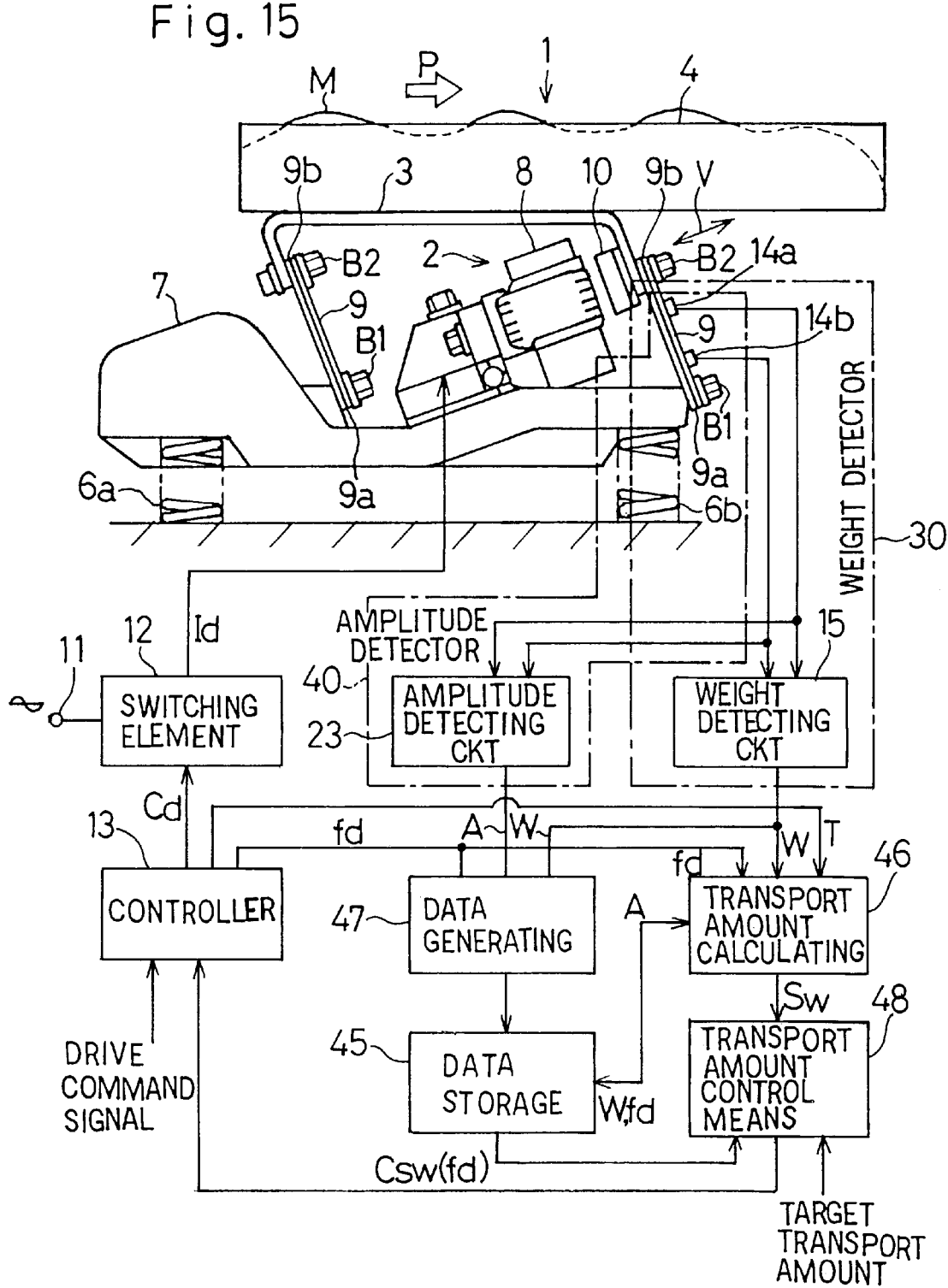
FIG. 15 is a diagram showing the structure of a vibrating feeder according to a thirteenth preferred embodiment of the present invention, shown together with a circuit block diagram.
Figure 18:
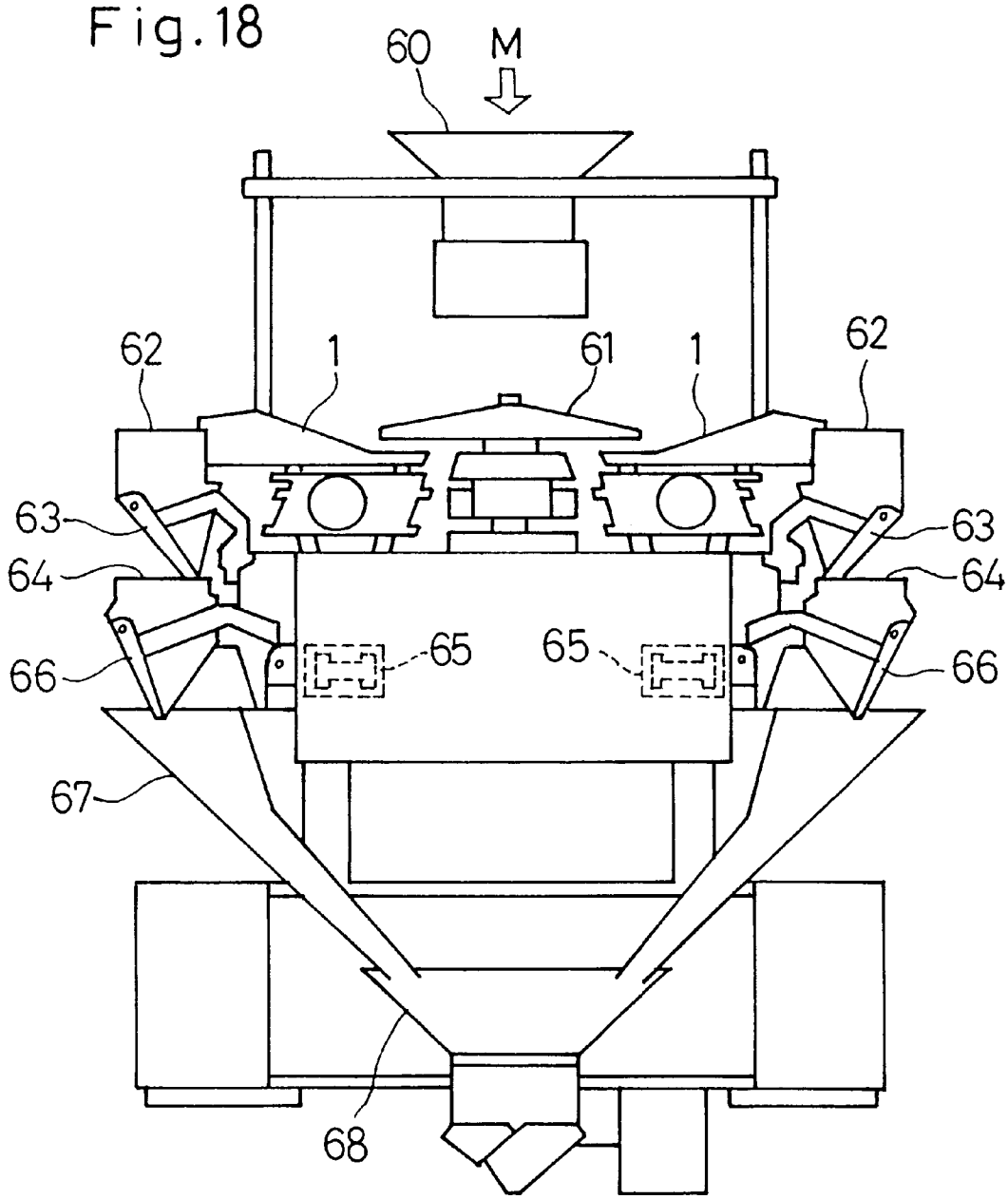
FIG. 18 is a schematic side view of a major mechanism of a combinational weighing apparatus.

The vibrating feeder according to a thirteenth preferred embodiment of the present invention is shown in FIG. 15. In FIG. 15, component parts similar to or identical with those shown in FIG. 1 showing the first embodiment of the present invention are designated by like reference numerals and, therefore, details thereof are not reiterated for the sake of brevity. Only differences the thirteenth embodiment of the present invention have in relation to any one of the foregoing embodiments thereof will be described hereinafter.

In order to accomplish an on-line adjustment of the transport amount Sw of the vibrating feeder 1, it is necessary to secure data of weight W of the articles on the trough, the driving frequency fd and the amplitude A of vibration of the trough (that of the leaf spring) on an on-line basis. In this thirteenth embodiment of the present invention, a data storage means 45 used therein is so designed as to store the driving frequency fd of the vibrator 2 and the amplitude A of the leaf spring 9 corresponding to the driving frequency fd of the vibrator 2 with the weight W of the articles on the trough 4 taken as a parameter, so that a transport amount calculating means 46 can read out the amplitude A from the data storage means 45 on the basis of the weight W of the articles detected by the weight detector 30 and the driving frequency fd inputted from the controller 13, to thereby calculate the transport amount Sw. It is, however, to be noted that although the data storage means 45 may have the above mentioned data stored beforehand, in the thirteenth embodiment of the present invention the data of the weight W, the amplitude A and the driving frequency fd all detected during operation of the vibrating feeder 1 are successively written in the data storage means 45 by a data generating means 47 to allow the latter to accumulate the necessary data.

The sequence of accumulation of the data in the data storage means 45 will now be described with reference to FIGS. 15 to 17.

At the outset, the controller 13 drives the vibrator 2 with the driving current Id at the driving frequency fd1 instructed by a drive command signal. At this time, the weight detector 30 and the amplitude detector 40 detect the weight W1 and the amplitude Aw1, respectively. The data generating means 47 writes the weight W1, the driving frequency fd1 and the amplitude Aw11 into the data storage means 45 as data in which as shown in FIG. 17 the weight W is used as a parameter. The transport amount calculating means 46 reads out the weight W1, which has been inputted thereto, and the amplitude Aw11, corresponding to the driving frequency fd1, from the data storage means 45 to thereby calculate the transport amount Sw1. A transport amount control means 48 then outputs to the controller 13 the transport amount control signal Csw, which is a frequency control signal for changing the driving frequency fd1 to a driving frequency fd2 lower a predetermined quantity than the driving frequency fd1, in the event that the inputted transport amount Sw is smaller than the instructed target transport amount.

The controller 13 upon receipt of the transport amount control signal Csw drives the vibrator 2 with the driving current Id at the driving frequency fd2. The weight detector 30 and the amplitude detector 40 then detect the weight W2 and the amplitude Aw12, respectively. The data generating means 47 writes the weight W1, the driving frequency fd2 and the amplitude Aw12 into the data storage means 45 as data in which as shown in FIG. 17 the weight W is used as a parameter. The transport amount calculating means 46 reads out the weight W1, which has been inputted thereto, and the amplitude Aw12, corresponding to the driving frequency fd2, from the data storage means 45 to thereby calculate the transport amount Sw2. A transport amount control means 48 then outputs to the controller 13 the transport amount control signal Csw for changing the driving frequency fd1 to a driving frequency fd3 lower a predetermined quantity than the driving frequency fd1, in the event that the inputted transport amount Sw2 is smaller than the instructed target transport amount.

In this way, the driving frequency control operation is repeated until the difference between the transport amount Swi and the target transport amount comes to fall within the predetermined tolerance to thereby set the driving frequency fdi falling within the predetermined tolerance. Should the weight W detected by the weight detector 30 change to a value W2, the vibrating characteristic curve deviates to a position where the frequency is low as shown in FIG. 16 and, therefore, the previously described driving frequency control operation is repeated to set the driving frequency fdi with which the target transport amount can be attained.

Since the data storage means 45 stores a new data each time the new data is obtained as a result of operation of the vibrating feeder 1, the data of the amplitude Ai corresponding to the driving frequency fdi in which the weight for each of various kinds of the articles is taken as a parameter is accumulated in the data storage means 45. Where the transport amount is controlled by the use of the previously discussed data, the transport amount calculating means 46 calculates the transport amount Sw based on the weight W inputted from the weight detector 30 and the transport time length (the operating time of the vibrator 2) T which can be either detected by the amplitude detector 40 or determined from the duration of the control signal Cd outputted from the controller 13.

The transport amount control means 48 outputs the transport amount control signal Csw to the controller 13 to cause the latter to change the amplitude A through adjustment of the driving frequency fd to thereby perform a correction by which the difference between the inputted transport amount Sw and the target transport amount can come to fall within the predetermined tolerance. The controller 13 controls the amplitude A to an instructed amplitude by adjusting the driving frequency according to the frequency of selective opening and closing of the switching element 12. By way of example, referring back to FIG. 4, if the driving frequency is set to a value fd4 close to the natural frequency fn1 while the driving frequency is fd1 and the weight is W1, the amplitude increases to a value such as indicated by A4. Accordingly, where the transport amount is desired to be 1.2 times, the transport amount control means 48 reads from the data storage means 45 the driving frequency fd4 that is necessary to render the amplitude to be 1.2 times and then outputs to the controller 13 the transport amount control signal Csw necessary to set the driving frequency to attain the value fd4.

If the target transport amount remains the same so long as the articles remain the same, reading the data of the amplitude from the data storage means 45 such as accomplished in this thirteenth embodiment of the present invention takes place at a higher speed than the amplitude A being calculated by the amplitude detector 40 and therefore, the transport amount can be controlled highly accurately by causing the transport amount calculating means 46 to read the weight Wi and the amplitude Ai, corresponding to the driving frequency fdi, from the data storage means 45 to calculate the transport amount Sw.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A vibrating transport apparatus for transporting an article loaded on a trough by vibrating the trough in a predetermined vibrating direction, which apparatus comprises:
   a weight detector for detecting a weight of the article placed on the trough;
   a storage means for storing an amplitude versus weight characteristic of a vibrating system of the trough; and
   a transport control means for determining an amplitude corresponding to the weight of the article, which has been detected by the weight detector, from the storage means, calculating a transport amount for a given unitary time from the determined amplitude and the weight of the article, and controlling the transport apparatus on the basis of the transport amount which has been calculated
   wherein said weight detector includes at least one strain gauge mounted on a portion of the transport apparatus where elastic strains are developed upon placement of the article on the trough.

2. A vibrating transport apparatus for transporting an article loaded on a trough by vibrating the trough in a predetermined vibrating direction, which apparatus comprises:
   a weight detector for detecting a weight of the articles placed on the trough;
   an amplitude detector for detecting an amplitude of vibration of the trough; and
   a transport control means for calculating a transport amount for a given unitary time from the weight of the article, which has been detected by the weight detector, and the amplitude which has been detected by the amplitude detector and controlling the transport apparatus on the basis of the calculated transport amount,
   wherein said weight detector includes at least one strain gauge mounted on a portion of the transport apparatus where elastic strains are developed upon placement of the article on the trough.

3. A vibrating transport apparatus for transporting an article loaded on a trough by vibrating the trough in a predetermined vibrating direction, which apparatus comprises:
   at least one strain gauge mounted on a spring member used to connect the trough and a base together;
   a weight detecting circuit for detecting a weight of the article placed on the trough on the basis of an electric output from the strain gauge;
   an amplitude detecting circuit for detecting an amplitude of vibration of the trough on the basis of the electric output from the strain gauge; and
   a transport control means for calculating a transport amount for a given unitary time on the basis of the detected weight and the detected amplitude and controlling the transport apparatus on the basis of the calculated transport amount.

4. A vibrating transport apparatus for transporting an article loaded on a trough by vibrating the trough in a predetermined vibrating direction with a vibrator, which apparatus comprises:
   a frequency adjuster for adjusting a driving frequency of the vibrator;
   a weight detecting means for detecting a weight of the article placed on the trough;
   a storage means for storing a plurality of amplitude versus driving frequency characteristics of a vibrating system of the trough which correspond to the weight of the article on the trough;
   a frequency control means for controlling an amplitude of vibration of the trough by controlling the frequency adjuster on the basis of the amplitude versus driving frequency characteristic, corresponding to the weight of the article detected by the weight detecting means, to change the driving frequency of the vibrator, wherein said weight detecting means includes at least one strain gauge mounted on a portion of the transport apparatus where elastic strains are developed upon placement of the article on the trough; and
   a transport control means for determining an amplitude corresponding to the weight of the article, which has been detected by the weight detecting means, from the storage means, calculating a transport amount for a given unitary time from the determined amplitude and the weight of the article, and controlling the transport apparatus on the basis of the transport amount which has been calculated.

5. A vibrating transport apparatus for transporting an article loaded on a trough by vibrating the trough in a predetermined vibrating direction with a vibrator, which apparatus comprises:
   a frequency adjuster for adjusting a driving frequency of the vibrator;
   an amplitude detector for detecting an amplitude of vibration of the trough;
   a weight detector for detecting a weight of the article placed on the trough;
   a storage means for storing a relation between the amplitude, detected by the amplitude detector when the driving frequency of the vibrator is changed under the detected weight of the article, and the driving frequency in correspondence with the weight of the article; and
   a frequency control means for controlling the amplitude of vibration of the trough by controlling the frequency adjuster on the basis of the amplitude versus driving frequency characteristic, stored in the storage means in correspondence with the detected weight of the article, to change the driving frequency of the vibrator,
   wherein said weight detector includes at least one strain gauge mounted on a portion of the transport apparatus where elastic strains are developed upon placement of the article on the trough, and
   a transport control means for determining an amplitude corresponding to the weight of the article, which has been detected by the weight detector, from the storage means, calculating a transport amount for a given unitary time from the determined amplitude and the weight of the article, and controlling the transport apparatus on the basis of the transport amount which has been calculated.

6. A vibrating transport apparatus which comprises:

a trough for receiving an article thereon;

a base;

at least one leaf spring for supporting the trough therethrough on the base;

a vibrator for vibrating the leaf spring;

a weight detector for detecting a weight of the article placed on the trough; an amplitude detector for detecting an amplitude of vibration of the leaf spring;

a data generating means for generating a data representative of a relation between a frequency of vibration of the trough and the amplitude detected by the amplitude detector by utilization of the weight of the article, detected by the weight detector during transport of the article by means of the trough, as a parameter;

a storage means for storing the data generated by the data generating means, wherein said weight detector includes at least one strain gauge mounted on a portion of the transport apparatus where elastic strains are developed upon placement of the article on the trough, and a transport control means for determining an amplitude corresponding to the weight of the article, which has been detected by the weight detector, from the storage means, calculating a transport amount for a given unitary time from the determined amplitude and the weight of the article, and controlling the transport apparatus on the basis of the transport amount which has been calculated.

7. The vibrating transport apparatus as claimed in claim 6, wherein said weight detector comprises at least one strain gauge mounted on the leaf spring for detecting an amount of strains developed in the leaf spring, and a weight detecting circuit for detecting the weight of the article on the basis of the amount of strains detected by the strain gauge.

8. The vibrating transport apparatus as claimed in claim 6, wherein said amplitude detector comprises at least one strain gauge mounted on the leaf spring for detecting an amount of strains developed in the leaf spring, and an amplitude detecting circuit for detecting the amplitude on the basis of the amount of strains detected by the strain gauge.

9. A vibrating transport apparatus for transporting an article loaded on a trough by vibrating the trough in a predetermined vibrating direction, which apparatus comprises:

an amplitude detector detecting an amplitude of vibration of the trough;

a storage means for storing an amplitude versus weight characteristic of a vibrating system of the trough; and a transport control means for determining a weight of the article placed on the trough on the basis of the amplitude, which has been detected by the amplitude detector, and the amplitude versus weight characteristic stored in the storage means, calculating a transport amount for a given unitary time on the basis of the determined weight of the article and the detected amplitude and controlling the transport apparatus on the basis of the calculated transport amount.

10. A vibrating transport apparatus for transporting an article loaded on a trough by vibrating the trough in a predetermined vibrating direction, which apparatus comprises:

an amplitude detector for detecting an amplitude of vibration of the trough;

a storage means for storing a resonance frequency characteristic of a vibrating system of the trough which corresponds to a weight of the article placed on the trough; and a transport control means for determining a weight of the article placed on the trough on the basis of the amplitude, which has been detected by the amplitude detector, and the resonance frequency characteristic stored in the storage means, calculating a transport amount for a given unitary time on the basis of the determined weight of the article and the detected amplitude and controlling the transport apparatus on the basis of the calculated transport amount.

11. A vibrating transport apparatus for transporting an article loaded on a trough by vibrating the trough in a predetermined vibrating direction, which apparatus comprises:

a frequency adjustor adjusting a driving frequency of the vibrating transport apparatus;

storage means for storing a resonance frequency characteristic of a vibrating system of the trough;

transport control means for determining a weight of the article loaded on the trough on the basis of the resonance frequency characteristic stored in the storage means, and calculating a transport amount for a given unitary time based on the determined weight of the article and the resonance frequency characteristic; and frequency control means for controlling an amplitude of vibration of the trough by controlling the frequency adjuster based on the determined weight of the article to change the driving frequency of the vibrating transport apparatus.

12. A transport apparatus to transport an article comprising:

a vibrating trough, the article being placed on the trough;

a weight detector detecting a weight of the article placed on the trough;

a storage unit storing an amplitude versus weight characteristic of a vibrating system of the trough; and a transport control unit determining an amplitude corresponding to the detected weight from the stored amplitude versus weight characteristic, calculating a transport amount for a given unitary time from the determined amplitude and the detected weight, and controlling the vibrating trough on the basis of the calculated transport amount, the weight detector including a strain gauge mounted on a portion of the transport apparatus where elastic strains are developed upon placement of the article on the trough.

13. A transport apparatus to transport an article comprising:

a vibrating trough, the article being placed on the trough;

a weight detector detecting a weight of the article placed on the trough;

an amplitude detector detecting an amplitude of vibration of the trough; and a transport control unit calculating a transport amount for a given unitary time from the detected weight, and the detected amplitude, and controlling the vibrating trough on the basis of the calculated transport amount, the weight detector including a strain gauge mounted on a portion of the transport apparatus where elastic strains are developed upon placement of the article on the trough.

14. An apparatus to transport an article comprising:

a vibrating trough, the article being placed on the trough;

a strain gauge mounted on a spring member to connect the trough and a base;

a weight detecting circuit detecting a weight of the article placed on the trough on the basis of an electric output from the strain gauge;

an amplitude detecting circuit detecting an amplitude of vibration of the trough on the basis of the electric output from the strain gauge; and a transport control unit calculating a transport amount for a given unitary time on the basis of the detected weight and the detected amplitude and controlling the vibrating trough on the basis of the calculated transport amount.

15. An apparatus to transport an article comprising:

a vibrating trough, the article being placed on the trough;

a frequency adjuster adjusting a driving frequency of the vibrator;

a weight detecting unit detecting a weight of the article placed on the trough;

a storage unit storing a plurality of amplitude versus driving frequency characteristics of a vibrating system of the trough which correspond to the detected weight of the article;

a frequency control unit controlling an amplitude of vibration of the trough by controlling the frequency adjuster on the basis of the amplitude versus driving frequency characteristic, changing the driving frequency of the vibrator on the basis of the detected weight, the weight detecting unit including a strain gauge mounted on a portion of the transport apparatus where elastic strains are developed upon placement of the article on the trough; and a transport control unit determining an amplitude corresponding to the detected weight of the article from the stored amplitude versus driving frequency characteristic, calculating a transport amount for a given unitary time from the determined amplitude and the detected weight, and controlling the vibrating trough on the basis of the calculated transport amount.

16. An apparatus to transport an article comprising:

a vibrating trough, the article being placed on the trough;

a frequency adjuster adjusting a driving frequency of the vibrator;

an amplitude detector detecting an amplitude of vibration of the trough;

a weight detector detecting a weight of the article placed on the trough;

a storage means storing a relation between the detected amplitude when the driving frequency of the vibrator is changed under the detected weight of the article, and the driving frequency in correspondence with the detected weight of the article; and a frequency control unit controlling the amplitude of vibration of the trough by controlling the frequency adjuster on the basis of the stored amplitude versus driving frequency characteristic, changing the driving frequency of the vibrator, the weight detector including a strain gauge mounted on a portion of the transport apparatus where elastic strains are developed upon placement of the article on the trough, and a transport control unit determining an amplitude corresponding to the detected weight of the article from the stored amplitude versus driving frequency relation, calculating a transport amount for a given unitary time from the determined amplitude and the weight of the article, and controlling the vibrating trough on the basis of the calculated transport amount.

17. A vibrating transport apparatus which comprises:

a vibrating trough receiving an article thereon;

a base;

a leaf spring supporting the trough therethrough on the base;

a vibrator vibrating the leaf spring;

a weight detector detecting a weight of the article placed on the trough;

an amplitude detector detecting an amplitude of vibration of the leaf spring;

a data generating unit generating a data representative of a relation between a frequency of vibration of the trough and the detected amplitude by utilization of the detected weight of the article, during transport of the article by means of the trough;

a storage unit storing the data generated by the data generating unit, the weight detector including a strain gauge mounted on a portion of the transport apparatus where elastic strains are developed upon placement of the article on the trough, and a transport control unit determining an amplitude corresponding to the detected weight of the article, from the stored data, calculating a transport amount for a given unitary time from the determined amplitude and the detected weight of the article, and controlling the vibrating trough on the basis of the calculated transport amount.

* * * * *